US006312610B1

(12) United States Patent
Kirker et al.

(10) Patent No.: US 6,312,610 B1
(45) **Date of Patent: *Nov. 6, 2001**

(54) DENSITY SCREENING OUTER WALL TRANSPORT METHOD FOR FLUID SEPARATION DEVICES

(75) Inventors: Curtis Kirker; Berkeley F. Fuller, both of Hawaii, HI (US)

(73) Assignee: Phase Inc., Kamuela, HI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/115,527

(22) Filed: Jul. 13, 1998

(51) Int. Cl.$^7$ .............................. B01D 21/26; B04B 1/12

(52) U.S. Cl. ....................... 210/781; 210/360.1; 210/377; 210/378; 210/380.1; 494/37; 494/44; 494/56; 494/80; 95/269

(58) Field of Search ................................ 210/360.1, 377, 210/378, 379, 380.1, 781; 494/43.56, 80, 44, 37; 55/345; 95/269; 209/254

(56) References Cited

U.S. PATENT DOCUMENTS

| | | | | |
|---|---|---|---|---|
| 2,539,529 | * | 1/1951 | Komline | 494/56 |
| 2,688,437 | | 9/1954 | Monnet | 223/20 |
| 3,937,317 | | 2/1976 | Fleury, Jr. | 198/213 |
| 3,960,318 | | 6/1976 | Dahlberg | 233/4 |
| 3,967,778 | | 7/1976 | Hunwick | 233/7 |
| 3,977,515 | | 8/1976 | Lewoczko | 198/213 |
| 4,005,817 | | 2/1977 | Charlton | 233/22 |
| 4,015,773 | | 4/1977 | Thylefors | 233/20 |
| 4,067,494 | | 1/1978 | Willus | 233/3 |
| 4,070,290 | | 1/1978 | Crosby | 210/91 |
| 4,103,822 | | 8/1978 | Stroucken | 233/20 |
| 4,251,023 | | 2/1981 | Hohne | 233/1 |
| 4,298,162 | | 11/1981 | Hohne | 233/7 |
| 4,331,270 | * | 5/1982 | Humlong | 224/32 R |
| 4,343,431 | | 8/1982 | Webling | 233/20 |
| 4,375,870 | | 3/1983 | Bodelson | 494/40 |
| 4,379,976 | | 4/1983 | Pitchford | 310/83 |
| 4,381,849 | | 5/1983 | Connut | 494/43 |
| 4,430,221 | * | 2/1984 | Spiewok | 210/380.1 |
| 4,504,262 | | 3/1985 | Forsherg | 494/53 |
| 4,505,697 | | 3/1985 | Lee et al. | 494/35 |
| 4,519,496 | | 5/1985 | Ludvegsen | 198/676 |
| 4,569,761 | * | 2/1986 | Spiewok et al. | 210/380.1 |
| 4,581,896 | | 4/1986 | Andeson | 60/487 |
| 4,629,564 | | 12/1986 | Pinato | 210/512 |
| 4,643,709 | | 2/1987 | Lee et al. | 494/37 |

(List continued on next page.)

FOREIGN PATENT DOCUMENTS

| | | | |
|---|---|---|---|
| 0346 056 | 12/1989 | (EP) | B04B/1/08 |
| 870 450 | 3/1942 | (FR) | 14/6 |
| 1 038 726 | 10/1953 | (FR) | 5/5 |

*Primary Examiner*—David A. Reifsnyder

(57) ABSTRACT

A method for segregating and transporting heavy particles thrown by centrifugal force from a flowing, spinning column of liquid or gas, whereby an outer cylinder whose inner walls present or face the center core with horizontal, circular bands of pyramidal or conical shaped voids, which bands can be vertically stacked to surround a device of any length, and the voids of which present to the heavy particles being thrown from the fluid a receiving surface consisting entirely of outward sloping surfaces, all of which sloped-surface voids accept, accumulate and gravitationally guide said heavy particles towards exit orifices or nozzles, which nozzles penetrate the outer cylinder and together with the sloped voids, permit the continuous, non-mechanically assisted accumulation and ejection of said heavy particles along the entirety of a centrifugal device of any length and thus for any desired duration (or residence time) of fluid flow.

5 Claims, 28 Drawing Sheets

U.S. PATENT DOCUMENTS

| | | | | |
|---|---|---|---|---|
| 4,698,053 | | 10/1987 | Stroucken | 494/70 |
| 4,701,158 | | 10/1987 | Inge et al. | 494/74 |
| 4,710,159 | | 12/1987 | Gullers | 494/27 |
| 4,721,505 | | 1/1988 | Inge et al. | 494/74 |
| 4,729,759 | | 3/1988 | Krook | 494/4 |
| 4,784,634 | * | 11/1988 | Schiele | 494/56 |
| 4,813,923 | * | 3/1989 | Johansson | 494/48 |
| 4,820,256 | * | 4/1989 | Nordstrom | 494/3 |
| 4,840,612 | * | 6/1989 | Pallmar | 494/1 |
| 4,861,329 | * | 8/1989 | Borgstrom et al. | 494/67 |
| 4,978,331 | | 12/1990 | Luchetta | 494/37 |
| 5,045,049 | * | 9/1991 | Lantz | 494/70 |
| 5,052,996 | * | 10/1991 | Lantz | 494/68 |
| 5,197,939 | | 3/1993 | Sederkvist | 494/53 |
| 5,202,024 | * | 4/1993 | Andersson et al. | 210/360 |
| 5,362,292 | * | 11/1994 | Borgstrom et al. | 494/74 |
| 5,374,234 | | 12/1994 | Madsen | 494/53 |
| 5,380,434 | | 1/1995 | Paschedag | 210/360 |
| 5,397,471 | | 3/1995 | Rodebush | 210/360 |
| 5,429,581 | | 7/1995 | Michand | 494/54 |
| 5,759,744 | * | 6/1998 | Brueck et al. | 430/312 |

* cited by examiner

FIG. 24a
(PRIOR ART)
U.S. Patent Oct. 19, 1976 3,986,663
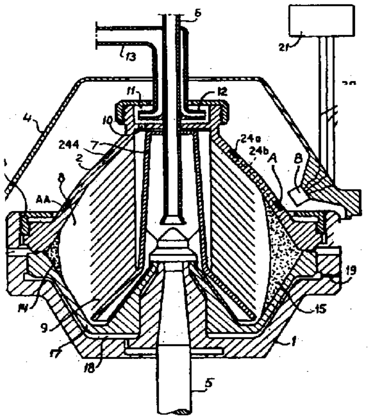
FIG. 24b
(PRIOR ART)
U.S. Patent Feb. 7, 1984 Sheet 1 of 3 4,430,071
FIG. 1
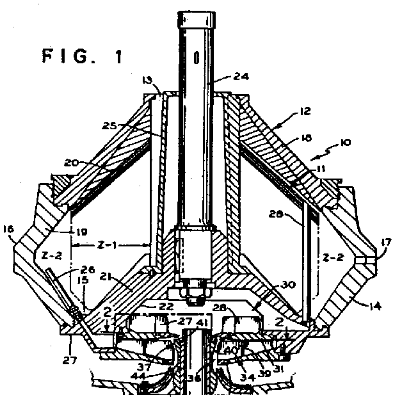
Patent Oct. 1, 1991 Sheet 1 of 6
U.S. Patent Aug. 29, 1989 Sheet 1 of 3 4,861,
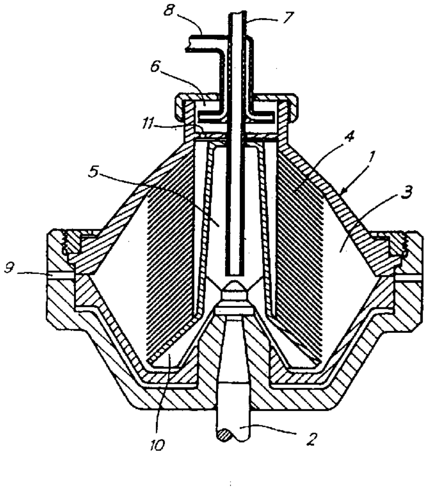
FIG 1
FIG. 24c
(PRIOR ART)
U.S. Patent Oct. 1, 1994 5,052,996
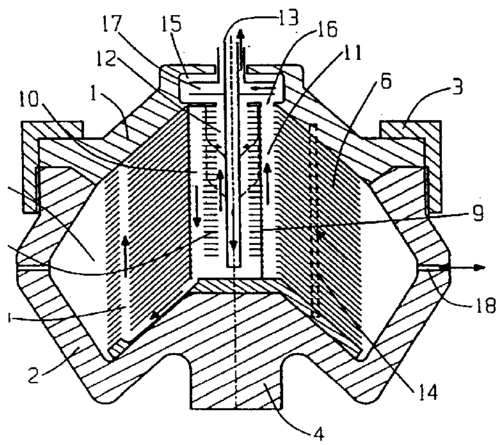
FIG. 24d
(PRIOR ART)

DENSITY SCREENING OUTER WALL TRANSPORT METHOD FOR FLUID SEPARATION DEVICES

BACKGROUND—FIELD OF INVENTION

The field of the invention is the "imperforate bowl," related to prior art under "fluid separation"—"tubal centrifuges," "nozzle centrifuges," and "decanting centrifuges."

BACKGROUND—DESCRIPTION OF PRIOR ART

Prior art contains three predominant methods for removing and separating, also called "transporting," the heavy particles thrown outwards by centrifugal force from a column of fluid or gas being spun within centrifugal separation devices. Each of these three transport methods is historically tied to particular types or classes of centrifugal devices, notably, tubal centrifuges, decanting centrifuges and cone centrifuges (cone type devices include Split Cone, Stacked Cone and Nozzle centrifuges).

Tubal Centrifuges include devices used in medicine and in pharmaceutical production, as well as ultra centrifuges, found notably in U.S. Patent classes 494 and 210. This type of centrifuge includes numerous variations on the single theme of a long solid core tube placed within a larger cylinder. Fluid enters one end of the device and flows longitudinally to opposite end, passing through the fluid work area, an elongated torroidal space formed between the core and the outer wall. During the duration of its passage through this elongated fluid work area, said fluid is spun, usually at high revolutions per minute, producing centrifugal forces as great as 10,000 gravities.

Heavier materials in the fluid, which is simultaneously moving lengthwise down the device and also rotating centrifugally, are thrown to the outside of the moving fluid column and impact the outer wall. Up to this point the device is separating materials in the fluid by their weight or density, but not yet transporting the heavy materials away. To do the transport work, most tubal centrifuges rely on manual or semi-automated material removal. This is done by draining the device, stopping its spin, and then mechanically scraping the impacted heavy particles from the outer wall.

Because nearly all tubal centrifuges are physically small and designed for processing low volumes of materials, they can attain comparatively high rates of spin and can thus create a comparatively large weight differential between materials of even quite similar densities. This large differential means that tubal devices can remove extremely small particles (down to one half micron or smaller) from a fluid flow.

Because of material bursting strength limitations at the required very high revolutions per minute (RPM's), however, tubal centrifuges are not expected to separate large volumes of fluid; and, because of their batch operating mode (they must be shut down to transport the heavy materials away from the device), they are also not satisfactory for continuous operation applications. The chief advantage of tubal centrifuges is their capacity for high spin speed, albeit with only small volumes, and their shape, long and narrow, which permits fluid to be held under gravitational spin for the entire length of travel down a device. Their shape permits what is thus called long "residence time" (the comparatively long time that the fluid is "in residence" inside the device and thus being acted on by centrifugal force).

Decanting centrifuges are a workhorse of high volume applications such as wastewater treatment and oil platform fluid recycling. Like Tubal centrifuges, decanters are long and narrow, again offering the advantage of long residence time. The transport method used in decanting centrifuges, however, means that unlike tubal devices, decanters can provide continuous operation, at least for periods of time.

The transport solution in such devices is to use a tight-fitting helical screw fitted against the inside of the outer wall, which scrapes out heavy materials being thrown and held against that outer wall. Among the numerous examples of decanting centrifuge prior art, including decades of improvement patents for various forms of multi-speed transmissions, wear-surface improvements and the like, are: U.S. Pat. Nos. 3,937,317, 3,960,318, 3,967,778, 3,977,515, 4,070,290, 4,251,023, 4,298,162, 4,379,976, 4,381,849, 4,504,262, 4,519,496, 4,581,896, 4,978,331, 5,197,939, 5,374,234, 5,380,434, 5,397,471 and 5,429,581. The foregoing is a representative, but by no means exhaustive, list of such prior work.

While the mechanical screw or conveyor transport system affords decanting centrifuges the advantage of continuous operation, such a system also brings with it complex problems, including the need for a complex multi-speed transmission to permit the outer cylinder to rotate at a slightly different speed from the scraper screw, as well as extremely high energy use, scraper friction and noise. The latter problems result in frequent downtime and maintenance cycles. Some decanting centrifuges are quite large, such that their main advantage is to combine both relatively high processing volumes and continuous transport (in between breakdowns or maintenance shutdowns).

In addition to the noise, vibration, high wear and energy use and high maintenance costs of decanting centrifuges, however, is another limitation, which is the upper limit of their commercial gravity production capacity, which lies between 2,500 and 3,500 gravities and which is thus insufficient to create the density differential required between materials of similar weights, required for the removal of particles smaller than about five microns from a fluid mix.

In theory, increasing the rotational speed of a decanting centrifuge could create gravities in the 5,000 to 8,000 range. However this gravity increase would enormously increase the weight of the heavy particles needing to be laboriously scraped along the entire length of the spinning decanter outer wall, such that the torsional strength of the screw conveyor would quickly be exceeded. And, even if a practical, torsionally stronger screw conveyor could be designed, the far heavier spun weight of the materials being thrown to the outer wall of such a device would unacceptably increase already high noise, energy use, wear and maintenance factors.

Cone Centrifuges. The third class of centrifuges approaches high volume in continuous operation in a more design-elegant way, through the use of the pure geometry in the form of the shape of the device's outer walls, in order to effect transport of the thrown, heavy materials. These devices are variously called Stacked Cone, Split Cone and Nozzle centrifuges, depending on the details of their inner core and of their heavy particle collection and ejection mechanisms. From within the large field of prior art for these centrifugal devices, notable are U.S. Pat. Nos. 4,005,817, 4,015,773, 4,067, 494, 4,103,822, 4,311,270, 4,343,431, 4,375,870, 4,505,697, 4,629,564, 4,643,709, 4,698,053, 4,701,158, 4,710,159, 4,721,505, 4,729,759, 4,759,744, 4,813,923, 4,820,256, 4,840,612, 4,861,329, 5,045,049, 5,052,996, 5,202,024, and 5,362,292. Again, the preceding list is not intended to be exhaustive, but rather illustrative of the cone centrifuge approach and some of the many attempts by numerous inventors and manufacturers to improve it over the years.

The key to the transport solution in all these cone centrifuge variants is their use of sloped surfaces which lead outwards in the direction of spin, at or greater than the 37 degree angle of repose, and which thus guide heavy materials thrown from the fluid in the device core to fall and slide gravitationally "downhill" into an outward bulging, annular or beltline valley. Such a valley uses slope shape and gravity alone to receive the heavy particles and then to guide them to ejection at the apex of said valley, either through nozzles or via the rhythmic opening and closing of the top and bottom conical outer shells which form the valley. For illustrations of this classical industry "collector valley approach," see the examples in FIG. 24, Drawings Section, which reprint the FIG. 1, respectively, from U.S. Pat. Nos. 3,986,663 (1976), 4,430,071 (1984), 4,861,329 (1989) and 5,052,996 (1991).

Most of these devices use another geometry technology in their cores called "stacked cones," which method amplifies the effect of centrifugal spin of the internal separation of heavy particles from the clarified fluid. The separation amplification effectiveness of stacked cones is historically well known. However it will be shown below that the separating efficiency of a stacked cone core is offset by inefficiency of these devices' transport scheme, namely their single collecting valleys or bulges.

The chief transport advantage of all the conical type centrifuges is that they use sloped shapes to gravitationally guide the heavy materials out of the device, rather than relying on a complex, high-wear mechanical scraping conveyor. Unfortunately, added plumbing, ejection-valving mechanisms, nozzle cleaning schemes and other refinements which have been made over the years to improve cone centrifuge performance, also appear to have substantially increased the complexity, initial cost and maintenance of this class of device.

As much of an industrial workhorse as they have become, cone centrifuges have an inherent geometry weakness in their transport scheme itself, which is that their single large beltline accumulation and discharge valley or zone substantially widens the total outside diameter of such devices. Since to accumulate the thrown heavy materials, the single collection valley must form a substantial outermost diameter bulge in these devices, and since this bulge lies farthest from the axis of spin, rotating this zone and the heavy materials in the fluid flow which stack up in this zone, it necessarily consumes a very large proportion of the total rotational energy required for such devices, even though this slope valley or zone is only being used for accumulation and ejection, not for separation itself.

To summarize: cone centrifuges are continuous in operation and they avoid some of the complex mechanical problems of decanting centrifuges. However, they too are energy inefficient, due to the shape of the very feature which is most impressive, their non-mechanical transport via sloped geometry. The high energy use to rotate the wide heavy material collecting bulge in these machines greatly offsets the separation efficiencies of their inner core stacked cones. In addition, like decanting centrifuges, cone type devices also cannot generally remove ultra-small particles. As with decanters, material strength has limited the rotational speed which can be attained, generally to below 3,000 gravities in industrial use, such that their achievable density differentials and thus their ability to remove very small particles from fluid flows, is limited to those generally above a three to five micron diameter.

To date all major centrifuge types (tubal, decanting, cone) and all their related transport designs, have of necessity made tradeoffs in such areas as: (1) processing volume versus particle size (decanters and cones process large volumes but can't remove ultra-small particles, while tubals can remove small particles but not in high volumes); (2) continuous operation versus mechanical elegance (decanters and cone centrifuges run continuously but are extremely expensive and complex, while tubals are often models of elegance but generally operate only in batch or semi-batch mode); and (3) the use of basic design elements (geometry plus gravity) to effect transport, versus complicated mechanical transport systems (cone device transport uses sloped surfaces, which reflects design elegance, while decanters use complex helical scrapers and multi-speed transmissions, which are inherently complex and maintenance prone). To date no surveyed designs combine all the advantages while minimizing all the disadvantages of prior art.

Objects and Advantages

The object of the heavy particle transport method known as "Density Screening" is to combine, in a single new method, all of the transport advantages from prior art, namely those found in existing tubal, decanting and cone centrifuge work, while eliminating or minimizing all of their disadvantages.

The resulting Density Screening method employs a thick-shelled outer cylinder wall, which can be designed in many sizes and shape variants, using many different hybrid combinations of materials. This wall is comprised of a series of indentations or negative spaces, called hereafter voids (see FIG. 6), each of which leads to a nozzle which penetrates the outer wall. This outer cylinder's inner wall or shell presents to the center core of a fluid separation device the pyramidal or conical shaped voids. These voids are arranged in evenly-sized and spaced circular bands, which horizontal bands of voids can be vertically stacked to entirely surround a device of any length. Together all these voids present to the heavy particles being thrown from the fluid a receiving surface consisting entirely of multiple, outward sloping surfaces. All of said sloped-surface voids accept, accumulate and gravitationally guide the heavy materials down the angle of repose towards exit orifices or nozzles. The openings or nozzles, which penetrate the outer cylinder, together with the sloped surfaces of the voids, permit the continuous, non-mechanically assisted accumulation and ejection of said heavy particles along the entirety of a centrifugal device of any length and thus for any desired duration (or residence time) of fluid flow.

This method for transporting heavy particles combines all the listed advantages from prior art transport designs. The method incorporates the overall shape or geometry advantages of tubal and decanting centrifuges, which are long and narrow and thus permit long residence time, along with the advantage of continuous transport operation from decanter and cone centrifuges. This method also combines the chief transport advantage of split cone centrifuges, which is their use of geometry or of sloped surfaces alone to facilitate heavy particle transport, rather than relying on complex mechanical screws or other conveyor mechanisms.

The Density Screening transport method also eliminates many disadvantages which variously plague prior art. First, it abolishes the key transport disadvantage of tubal centrifuges, which is their need to be intermittently stopped for cleaning, while still utilizing their desirable long and tall shape, and, it also eliminates the key transport disadvantage of decanter centrifuges, which is their mechanically complex, high-energy-using, high-wear mechanical screw transport systems.

In addition, the Density Screening method eliminates the chief disadvantage of stacked cone, nozzle and split-cone type centrifuges, which is the high energy consumption caused by their particular application of transport slope geometry, in the form of their single large beltline accumulation and discharge valley or zone that forms the widest part of the outside diameter bulge of such devices, which zone, being furthest from the axis of spin, requires the greatest proportion of the total energy used for rotation of such devices, even though this zone is only being used for accumulation and ejection, not for separation itself. See FIG. 25, perspective view, 26, top view, for visual clarification of this beltline bulge collecting geometry.

In replacing the solitary, very deep, sloped discharge zones such as are used in cone centrifuges with the Density Screening method's multitude of smaller, shallower pyramidal or conical collecting voids, the diameter of any given centrifugal device becomes much narrower than in a comparable-volume cone centrifuge, such that rotational energy required to achieve given revolutions per minute and gravities is substantially smaller.

Such a device, having a much narrower diameter, may with any given structural material strength, be spinable at significantly higher revolutions per minute, thus separating particles having comparatively smaller density differentials between them than is presently possible in centrifuges using existing slope-based (non-mechanical) transport geometries. For a visual clarification of the geometric, diameter-reducing advantages of the Density Screening method, see FIG. 25, perspective view, and 26, top view, particularly as compared to FIGS. 27 and 28, and also in comparison with FIG. 24 herein.

A summary of the combined advantages of the Density Screening method are as follows:

The use of many collecting voids reduces overall centrifuge device diameter, and moves the center of gravity of the heavy materials being collected closer to the axis of spin.

The Density Screening method employs many comparatively shallow outward facing pyramidal or conical voids instead of the single, wide-diameter collecting bulge as used in prior art cone centrifuges. The use of these many, smaller collecting voids reduces the overall rotational diameter for any given centrifugal device, and more notably, brings the center of gravity of already separated material being spun for final collection and transport much closer in to a given device's axis of spin than has been possible in cone centrifuges.

This reduction in diameter: (1) substantially reduces the amount of rotational energy consumed; (2) permits larger diameter, larger volume devices to be built, since material strength and rotational energy are not being squandered in support of the single, excessively wide beltline collecting area; and/or, (3) permits equivalent volume devices to be built for operation at higher rotational speeds. Put another way, using the Density Screening outer wall transport method and geometry, material strength and rotational energy are no longer being devoted to the rotation of the heavy materialst ejected particles at a device's widest diameter. Or conversely, the need for exceedingly high material strength to overcome the impact of centrifugal forces on an overly broad outer diameter, can be somewhat reduced for any given size device.

Many collecting voids permits the use of pure-geometry or slope type transport to surround centrifuge cores which are long and narrow, and thus provide high residence time Tubal and decanter centrifuges are desirable because they hold the fluid being processed in centrifugal spin for the entire length or residence time of their interiors. Adding the Density Screening outer wall transport method around such separating core technologies (tubal and decanter), combines their processing advantage of long residence time with the mechanically simple, pure geometry transport advantages of cone centrifuges.

For visual clarification of this point, see Drawing Section, FIGS. 3 and 19, which illustrate a Density Screening outer transport wall surrounding tubal centrifuge solid cores. In FIG. 3, the Density Screening wall is shown as it appears to the naked eye (bottom portion of wall illustration), and also with the outer wall partially cut away (upper portion of wall illustration), revealing the usually hidden outer or back sides of some of the horizontal bands or banks of pyramidal or conical heavy material collecting voids. FIG. 19 is an overview schematic suggesting the fluid flow path (in this case from top to bottom), down through the fluid work area, and the heavy particles being thrown into the voids of the Density Screening outer wall, along the full length of fluid flow.

The multiplicity of collecting voids combine the advantages of long residence time, as in tubal and decanting centrifuges, with the core-separating efficiency advantages of stack cone centrifuges The inventors' review of cone centrifuge prior art (stack-cone, split-cone, nozzle centrifuges) suggests a clear geometric design limitation to the length or height of such devices. In all prior art seen, stack cone devices are short and squat, as compared with tubal and decanting centrifuges, which are long and tall. This is due to the following logical and geometric limitation: the taller a stack of stack cones in the core of a centrifuge, the broader must be such a device's central beltline collecting valley, in order that such slopes of such valley remain at or greater than the 37 degree angle of repose necessary to create the sufficient downhill path for collecting the heavy materials thrown from all of the stacked cones, including those at the extreme top and bottom of such a device. In other words, because of the necessary fixed relationship between the height of a stack of cones and the necessary width of a single outer collecting valley, the inventors have not anywhere seen a stack cone device in prior art having a length two, three or more times its width. Whereas, the lengths of tubal and decanter centrifuges are often two, three, four or more times their widths.

If, by contrast, a collection of stack cones were to be surrounded by an outer transport wall of the Density Screening method, with many small collecting voids replacing the single large collecting valley of traditional cone centrifuges, it is immediately obvious that there is no such forced relationship between the number of stacks, or the length of the core of such a device, and its diameter. Using the Density Screening method, one can simply add as many horizontal bands of outer collecting voids as necessary to match the length of the centrifugal core of however many stacked cones are desired. For visual clarification of this fact, see Drawing Section, FIGS. 4 and 5. FIG. 4 is very similar to FIG. 3, showing again a cut-away view of a Density Screening method outer transport wall, only this time (in FIG. 4) the wall surrounds a long centrifuge core made up of a very tall stack of stacked cones. FIG. 5 (one many field assembly schematics produced to develop the feasibility of applying the Density Screening outer wall method to various centrifuge cores) shows horizontally cast outer wall segments surrounding a very tall stack of stacked cones, illustrating the combination of a stacked cone separating core with a tall or long device providing long residence time.

Novel and Innovative Methods of Construction Works as a Multiplying Effect on All the Preceding Advantages To date, all of the cited advantages provided by the Density Screening outer wall transport method stem from innovative geometry of design and from the many possible combinations of that geometry with various kinds of existing centrifuge cores. In all of these combinations, the prior art centrifuge core types (tubal, decanting, and stack-cone) provide for the separation component for a given device, whereas the Density Screening method outer wall completely revises the method for the second necessary function of fluid separation, which is transporting separated heavy materials away from the spinning fluid core and out of a device.

However, there is a second entire domain of the Density Screening outer wall transport method, which is its approach to using materials and fabrication methods undocumented in spinning centrifuge prior art, in a manner which obtains novel and innovative (in this field) combinations of previously unheard of wear and mechanical advantages, and with far lower construction costs.

Wear Surface Technology

Spinning centrifuges face two primary material challenges: wear and abrasion from particles made extremely heavy by centrifugal force being thrown at the outer surfaces of a device; and, bursting strength, or that material strength required to keep a centrifuge from exploding or otherwise failing due to the effect of centrifugal force itself on the outer wall. This force is multiplied by the immense additional weight of the separated particles, whose weight, once again, has itself been many times amplified by centrifugal force, and which particles are continuously being thrown outward and impacting the already centrifugally stressed outer wall.

As stated earlier, wear and abrasion are particularly thorny problems for decanting centrifuges, since they use mechanical scraping schemes for transport. However, both patent and product literature voluminously document the many ways in which wear and abrasion affect all large industrial centrifuges.

Bursting Strength Technology

Until now, the limitations of material strength appears to have drawn a line in the sand regarding how large spinning centrifuges can be, and how fast they can spin. The material class whose strength has defined these significant size and speed design limits is metal.

Such metal casting and carving fabrication techniques, as applied to centrifuge design and construction, represent a thoroughly mature technology. Their size and speed limitations as applied to centrifuges are well known. And, as stated above, their limitations have governed centrifuge development until now.

In those parts of such devices having high-strength requirements, such as all parts to be high-speed rotated out away from the axis of spin where centrifugal force is the highest, metal parts in final assembly are often laboriously x-rayed to uncover metal crystal and/or welding flaws which would compromise bursting strength. The high cost of cast steel and alloys with predictable, uniform crystal structure and strength, and the equally high cost of carving, finishing and testing such parts, is well documented. A single large decanting centrifuge, for example, can cost a million dollars or more. A single cone centrifuges, also metal fabricated, can cost a quarter million dollars or more. Tubal centrifuges, again made of cast and carved metals, can spin much faster and produce much higher gravities than the other devices, but only because of their deliberately small diameters which keep the centrifugal forces produced within the available strength of the metals used.

Dynamic Balance, Structural Stiffness and Torsional Rigidity to Control Harmonics As mentioned earlier in this application, virtually all of the centrifuge types reviewed in this application are constructed of steel, steel alloys or titanium. These devices, be they tubal, decanting or split cone, are metal-crafted. They are cast, carved, further machine-milled and finished, and, during assembly, must be dynamically balanced using extremely costly metal fabricating and finishing machinery. In devices designed to attain comparatively higher rotational speeds, another problem must be addressed, which is harmonics. In a centrifugal device, spinning at 2,000 or 3,000 RPM, filled with extremely heavy fluid whose heavier components are being thrown outwards at greatly increased weights due to gravitational force, harmonics or misaligned vibrational forces can quickly cause structural failures.

Centrifuge device assemblies for high-speed operation must therefore achieve overall dynamic balance, and they must be structurally stiff, since flexion can induce wobble or harmonic vibrations, and they must also be torsionally rigid, since twisting forces in an overall device can also induce destructive harmonics.

Hybridizing Several Different Material Technologies to Best Address Wear, Bursting Strength, Dynamic Balance, Stiffness, and Torsional Rigidity As a significant part of the work done to develop the Density Screening outer wall transport method, the inventors have extensively reviewed late 20$^{th}$ century material science from manufacturing areas entirely outside of centrifugal devices. This review of so-called new materials has led to another key feature of the Density Screening method, which is to combine in a hybrid or sandwich construction manner, three different material technologies, each ideally suited to solving selected challenges in centrifuge design and performance. FIG. 16, Drawing Section, illustrates the deceptively simple appearing outcome of this re-thinking.

Reading FIG. 16 from left to right, the sequence of materials in the optimum hybrid or sandwich construction of one cut-away, pyramidal void section of a Density Screening outer wall is presented as each would be sequentially encountered by a heavy particle being thrown via centrifugal force, outwards from the spinning column of fluid, in any centrifugal device core.

Ignoring for a moment the detail of nozzles (far left, part 11), the heavy particles being thrown outward encounter the first layer of a Density Screen outer wall, a layer known as a wear surface (part 12). Such a surface can be a thin-stamped or cast piece of metal, ceramic or other material. One surprisingly economical possibility for this innermost layer is thin-stamped aluminum, whose facing surface is transformed prior to wall assembly into an ultra-hard coating of sapphire via Positive Vapor Deposition (PVD). This innermost layer of the Density Screening materials hybrid or sandwich is configurable to economically achieve extreme wear and abrasion resistance.

Regarding nozzles (extreme left, part 11, in FIG. 16), there are numerous ultra-hard, off-the-shelf nozzle technologies to chose from, to fit into the apex opening of each pyramidal or conical void. Such nozzles are readily available in ruby, sapphire and diamond, with many thread and other attachment variations and are offered in a broad variety of orifice sizes.

Moving outwards past the wear surface layer of the Density Screening hybrid or sandwich, next is seen the compression transfer layer or component (part 2). Bearing in mind the extreme weight and centrifugal thrust of the heavy particles continuously bombarding the outer wall of a centrifuge, a practical means must be devised to support the thin wear surface layer by transferring the compressive loads of such bombardment along to the outer parts of the Density Screen outer wall.

FIG. 16 thus next shows an incompressible load transferring casting (part 2), which can be fabricated to extremely accurate size, weight and density tolerances via investment casting. Investment casting of ceramic, aluminum or other materials produces parts of high precision and intricacy, whose uniform size, stiffness and density makes them intrinsically dynamically balanced, and thus ideal for centrifuge outer wall use, as the compression transfer element of the sandwich. It is the inventors' intent to explore several multiple void casting schemes, including fabricating multiple voids as vertical castings (FIG. 13), as horizontal castings (FIG. 14), and as monolithic or one-piece castings (FIG. 15). When employing Density Screening outer transport walls for very high rotational speed devices, it is anticipated that the monolithic or one-piece approach, fabricated of various materials via investment casting, will yield the greatest stiffness and torsional twist resistance.

Moving further outwards (left to right) in FIG. 16, next comes a simple stainless steel outer cylinder (part 5), surrounding and providing a shape-holding element for the compression load transfer castings. This stainless steel outer cylinder provides minimal structural strength. Instead, it serves as the mold or mandrill for the final piece of the Density Screening construction method hybrid sandwich, which is another late $20^{th}$ century technology called "Filament Winding."

Certain artificially produced fibers, notably arymid (also called Kelvar) and carbon, exhibit some of the highest tensile strengths known to science. Carbon fiber, for example, can provide a tensile strength seven to ten times higher than that of titanium, and with many more times than that afforded by any steel alloys. Numerous applications using such fibers in various ultra-high-strength applications are well documented, all outside of the centrifuge industry. Coating such fibers with various resin-binder chemicals, and then continuously winding them around the outer surface of a vessel translates these materials' very high tensile strength into extremely high bursting strength for such a container.

Thus, the outermost layer of the construction method for Density Screening is achieved through filament winding (farthest right in FIG. 16, part 6). This part of the construction is done by applying resin-impregnated carbon, kevlar and/or mixtures of these and other high-strength filaments as the outer wrapping, over the shape-forming stainless steel mandrill layer. After filament winding is complete, the inexpensive stainless steel, cylindrical mandrill is simply left in place as an essentially inert part of the outer wall.

Beyond the dramatic increase in achievable bursting strength for any given size spinning centrifugal device offered by filament winding technology, is a second major and well-documented feature of this technology, torsional stiffness. Currently, filament winding is a mature technology used to create helicopter transmission shafts, spinning jet engine components and other extremely high-stress spinning elements which must transfer rotational energies without twisting, and while resisting the development of harmonics from twist or flexion. Applying filament winding as the outer hybrid component of Density Screening outer transport walls brings not only previously unknown bursting strength but also the ability to resist and contain torsional twisting and related harmonics, an ability very much required for centrifugal devices planned to achieve the rotational speeds required to produce 5,000, 8,000 or more multiples of gravity.

Centrifuge Ramifications of Using These Multiple-Technology Materials in Hybrid Construction The hybrid method of construction detailed in the preceding section of this application yields an outer wall technology, the Density Screening method, which not only benefits from all of the geometry improvements heretofore noted, but which can also, device by device, deliver as much as ten times more bursting strength than can a steel walled counterpart, while additionally offering the dynamic balancing, stiffness and torsional rigidity qualities required for extremely high RPM operation. These combinations of strengths will also be achievable at far lower design and construction costs than can be attained via the metallurgical craft construction methods used in prior art.

The combined or synergistic strength features of the method of construction presented, translates to devices using the Density Screening outer wall transport method, and surrounding tubal, decanting or stack-cone cores, buildable to any practical length (for long residence time), and constructable in either larger diameters than is presently practical (thus accommodating larger volumes of fluid processing per device), or operable at considerably higher revolutions per minute, thus producing substantially higher gravities than can be achieved at present in any devices except small-volume, batch-fed tubal centrifuges.

In combination with the diameter-reducing, long residence time-enabling, and other transport efficiency geometry advantages of the Density Screening method, this method's innovative hybrid construction approach yields a powerful and extremely flexible design methodology system which promises a harvest of multiple and significant new devices for the foreseeable future. The inventors will be completing and filing a continuing stream of device and additional utility patents, will shall refer back to this initial utility patent.

It may be of particular interest to those who study the art of invention that the fresh, overview undertaken of centrifuge geometry was accomplished simultaneous to the inventors'review of material science art, and that these two studies being done together, yielded unusually productive results. In other words, realizations about the complementary strengths of the hybrid sandwich materials construction literally fed and made possible radical new thinking about outer wall geometry. And conversely, novel approaches being made in that outer wall geometry thinking cross-fertilized the search for exactly the right material elements to best make up strongest, most economical and most practical-to-manufacture hybrid materials construction approach.

DESCRIPTION OF DRAWINGS

FIG. 24 (*a*). Reprint of FIG. 1 of Prior Art U.S. Pat. No. 3,986,663.

FIG. 24 (*b*). Reprint of FIG. 1 of Prior Art U.S. Pat. No. 4,430,071.

FIG. 24 (*c*). Reprint of FIG. 1 of Prior Art U.S. Pat. No. 4,861,329.

FIG. 24 (*d*). Reprint of FIG. 1 of Prior Art U.S. Pat. No. 5,052,996.

LIST OF REFERENCE NUMERALS

Part 1 Entry Reducing Cone for Tubal Type Centrifuge Inner Core
Part 2 Pyramidal Void Outer Wall Casting
Part 3 Pyramidal Voids
Part 4 Pyramidal Exit Openings
Part 5 Exterior Cylinder Jacket
Part 6 Exterior Jacket Reinforcement
Part 7 Inner Centrifuge Core, Tubal Type
Part 8 Vertical Bolt Holes
Part 9 Inner Centrifuge Core, Stacked Cone Type
Part 10 Cast Slots to Receive Tubal Core Vanes
Part 11 Exit Nozzles (Ruby, Diamond, Sapphire, etc.)
Part 12 Inner Wall Wear Surface
Part 13 Central Core Backbone Pipe
Part 14 Main Fluid Entry Opening
Part 15 Fluid Entry Ports
Part 16 Inner Core Entry Expanding Cone
Part 17 Vertical Flow Channels (Tubal Variant)
Part 18 Anti-Vorticity Vanes (Tubal centrifuge core only)
Part 19 Inner Core Exit Reducing Cone
Part 20 Fluid Outlet Ports
Part 21 Main Clarified Fluid Exit Opening

DESCRIPTION OF THE INVENTION

First Embodiment

Figure 1:
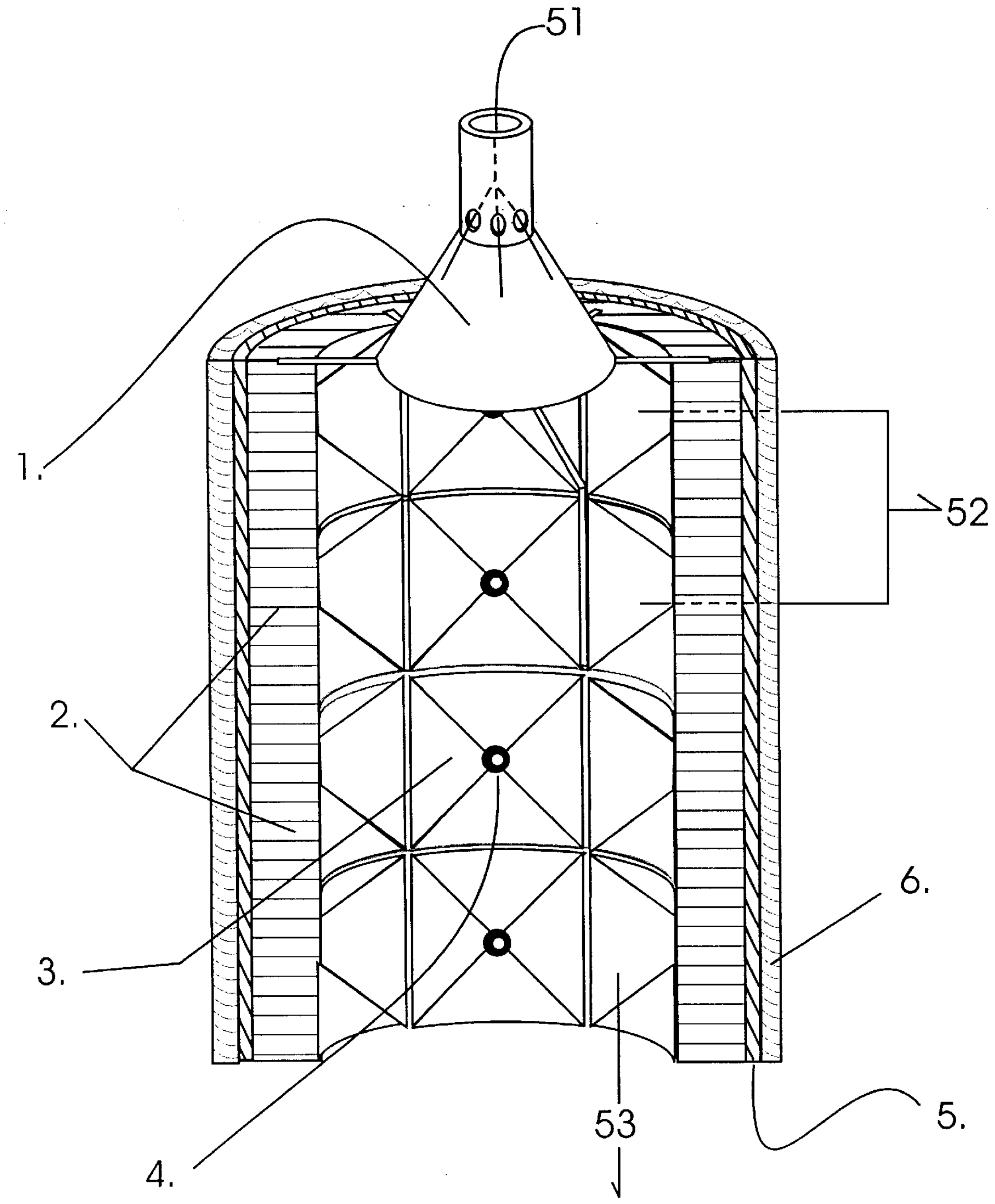
FIG. 1 A Density Screening outer wall, perspective and cut-away view, including a view of an inlet feed reducing cone for a tubal centrifuge core (which core is not shown).

FIG. 1 shows a perspective, cut-away view of a Density Screening outer transport enclosing wall for a tubal type centrifuge core, featuring vertically stacked circular arrays of pyramidal (in this example) heavy particle capturing voids, each of which void leads outwards, or gravitationally, downwards, to an exit nozzle. Such an outer enclosing transport wall may be comprised of any number of vertically stacked bands, to achieve enclosure of centrifugal cores of any practical length, so as to optimize the residence time for such a device. Also shown in FIG. 1 is a standard reducing core at the entrance (top), which directs the inbound fluid, here shown traveling lengthwise from top to bottom of a device, into the narrow band work area between a solid core, whose diameter matches the outer flare of the reducing cone, and the Density Screening outer wall of voids.

Figure 2:
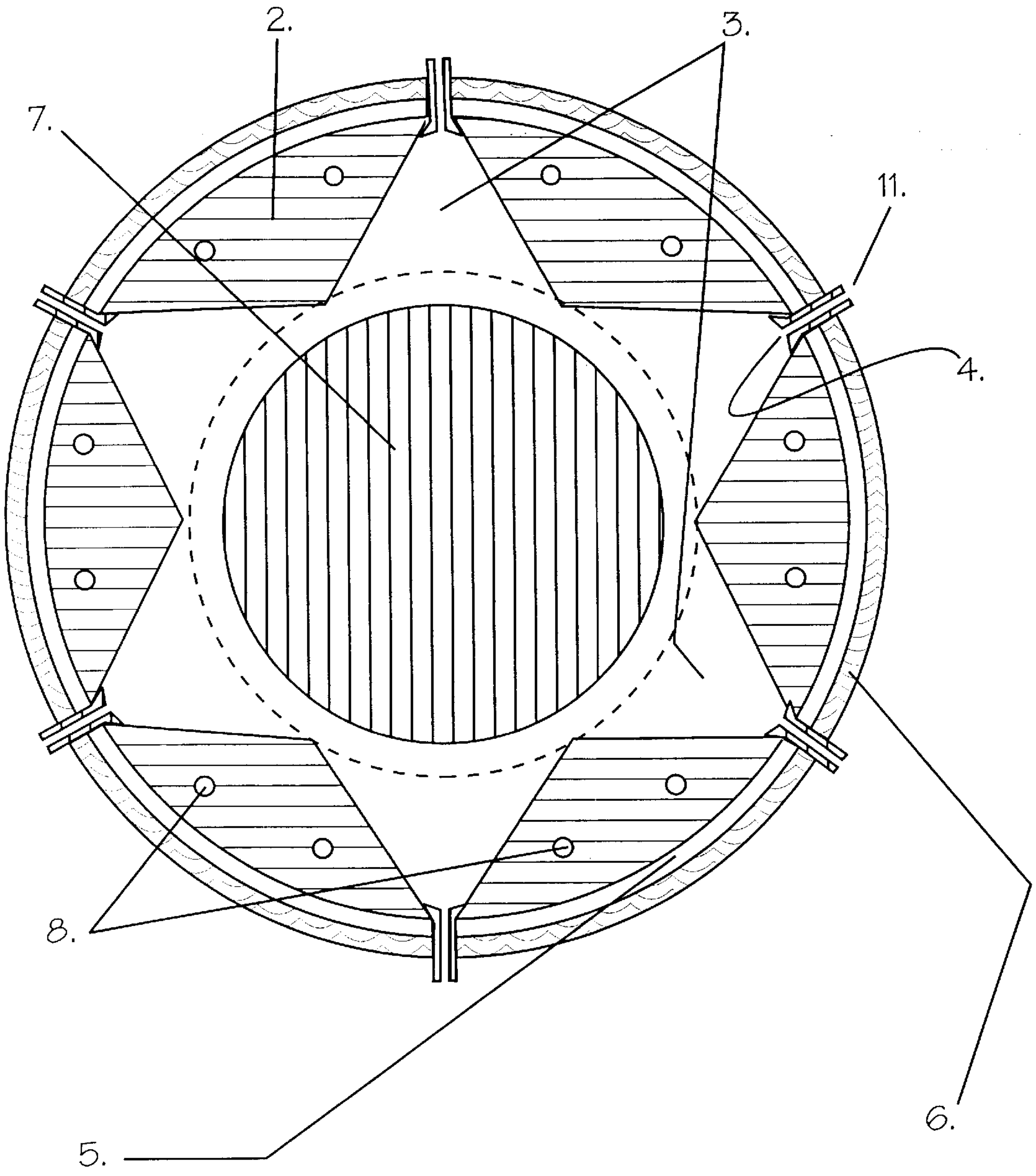
FIG. 2 The same Density Screening outer wall, top view, additionally showing a solid tubal centrifuge central core (vertical hatching), the fluid work area (circumscribed by a dotted line), a cross section of the outer wall, this variant having six pyramidal voids per horizontal layer, plus exit nozzles.

FIG. 2 shows a top view of the same combination a tubal centrifuge, solid inner core, placed inside a Density Screening outer transport wall. In FIG. 2 the fluid is flowing down onto the page while centrifugal forces produced by rotating the entire assembly are throwing the heavier materials outwards, or as shown in FIG. 2, around all points of the compass, through the collector nozzles shown.

Figure 3:
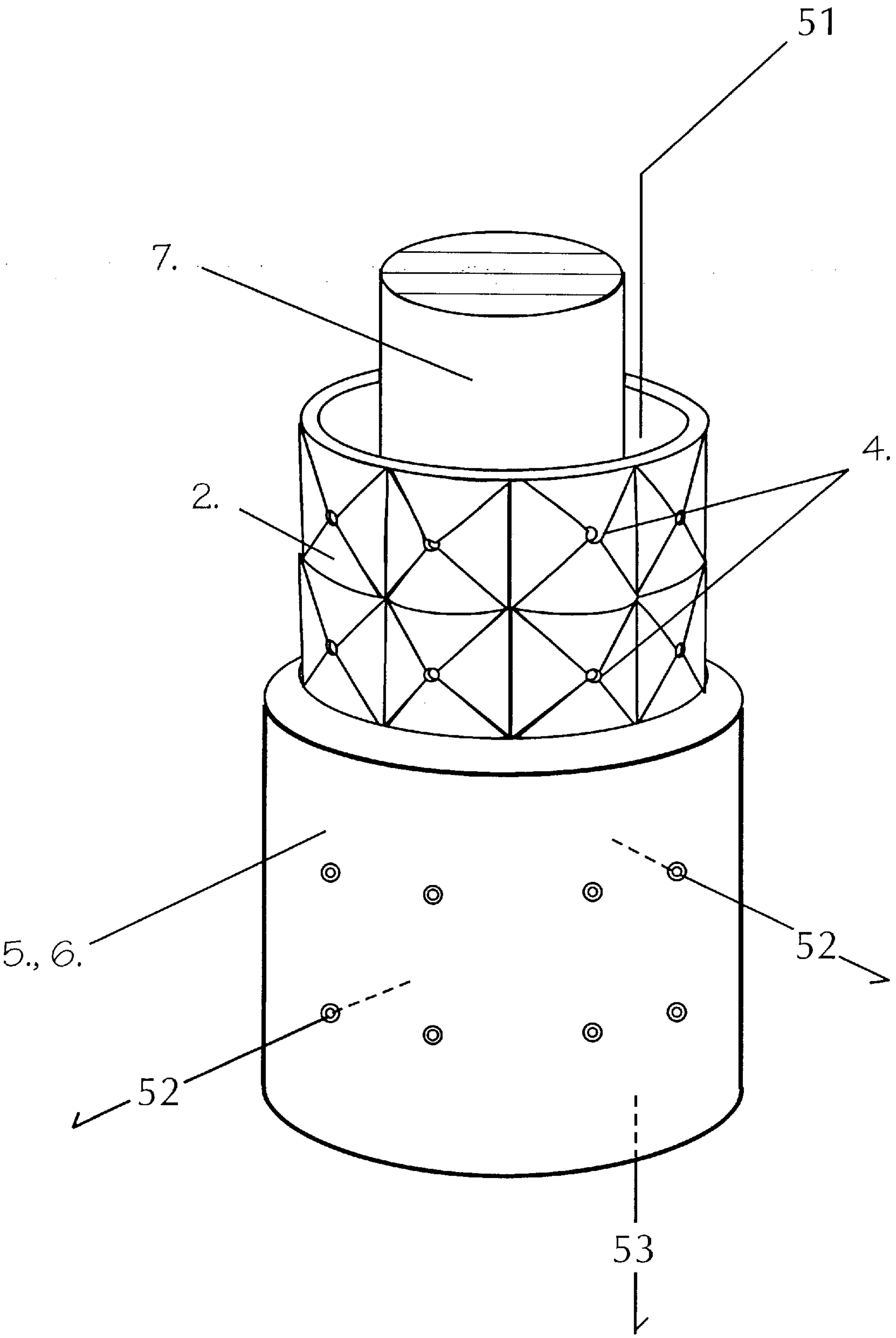
FIG. 3 A Density Screening outer wall, perspective view, showing the actual appearance to the naked eye (lower portion), plus a partially cut-away view (upper portion) revealing the outside or backside of the pyramidal voids, normally not viewable, all surrounding a solid Tubal Centrifuge core.

FIG. 3 shows a perspective, partially cut-away view of this same embodiment, of a Density Screening method outer transport wall surrounding the solid central core of a modified tubal centrifuge. This Figure reveals in x-ray fashion the normally not seen backs or outsides of the annular bands of voids (top portion of Density Screening wall shown), and then toward the bottom of the Density Screening wall portrayed, shows the actual outer appearance of that wall, a comparatively smooth surface penetrated only by the various void nozzles.

Alternate Embodiment

Figure 4:
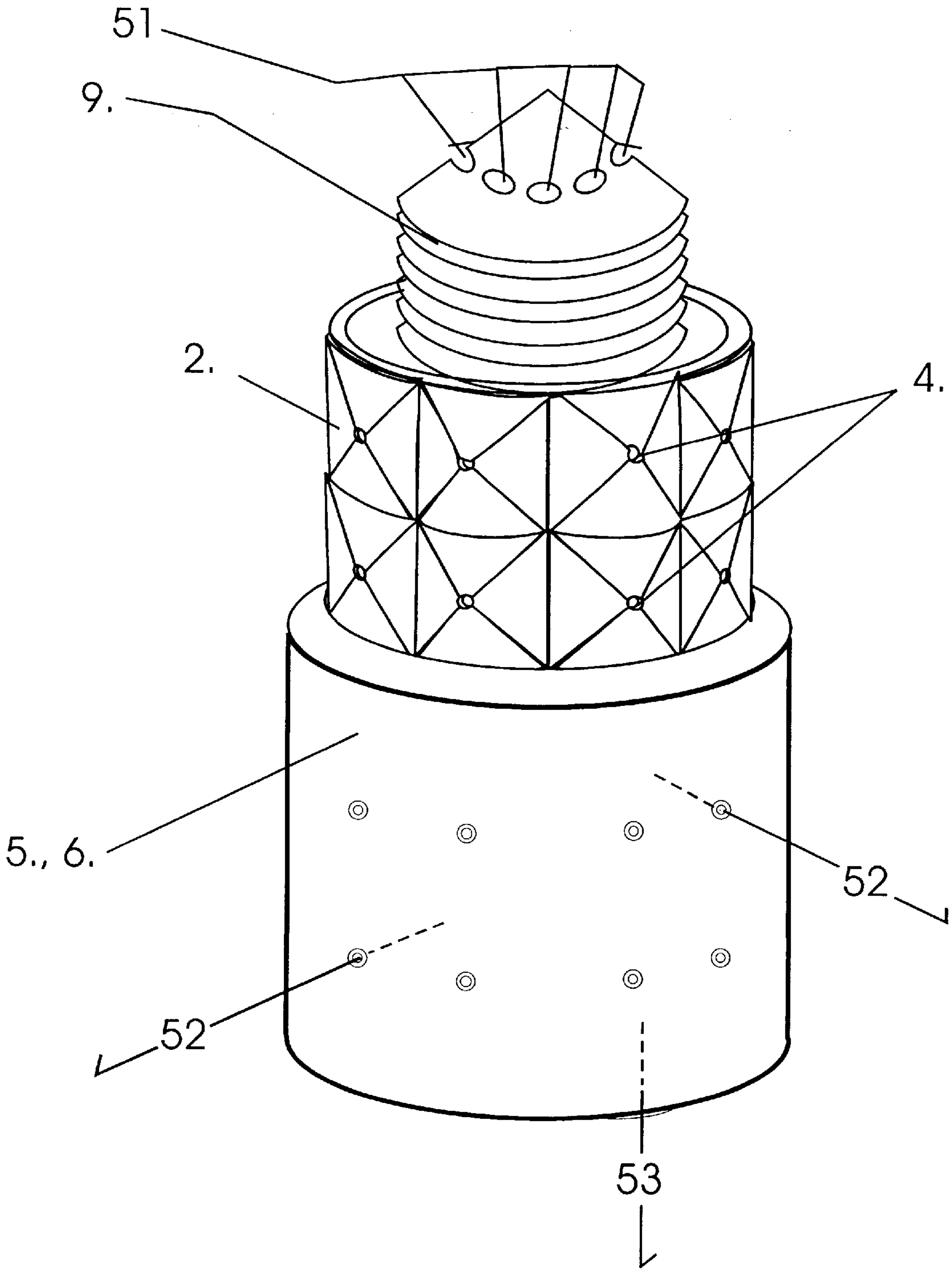
FIG. 4 A Density Screening outer wall, perspective view, showing the actual appearance to the naked eye (lower portion), plus a partially cut-away view (upper portion) revealing the outside or backside of the pyramidal voids, normally not viewable, all surrounding a Stack Cone type of centrifuge central core.
Figure 5:
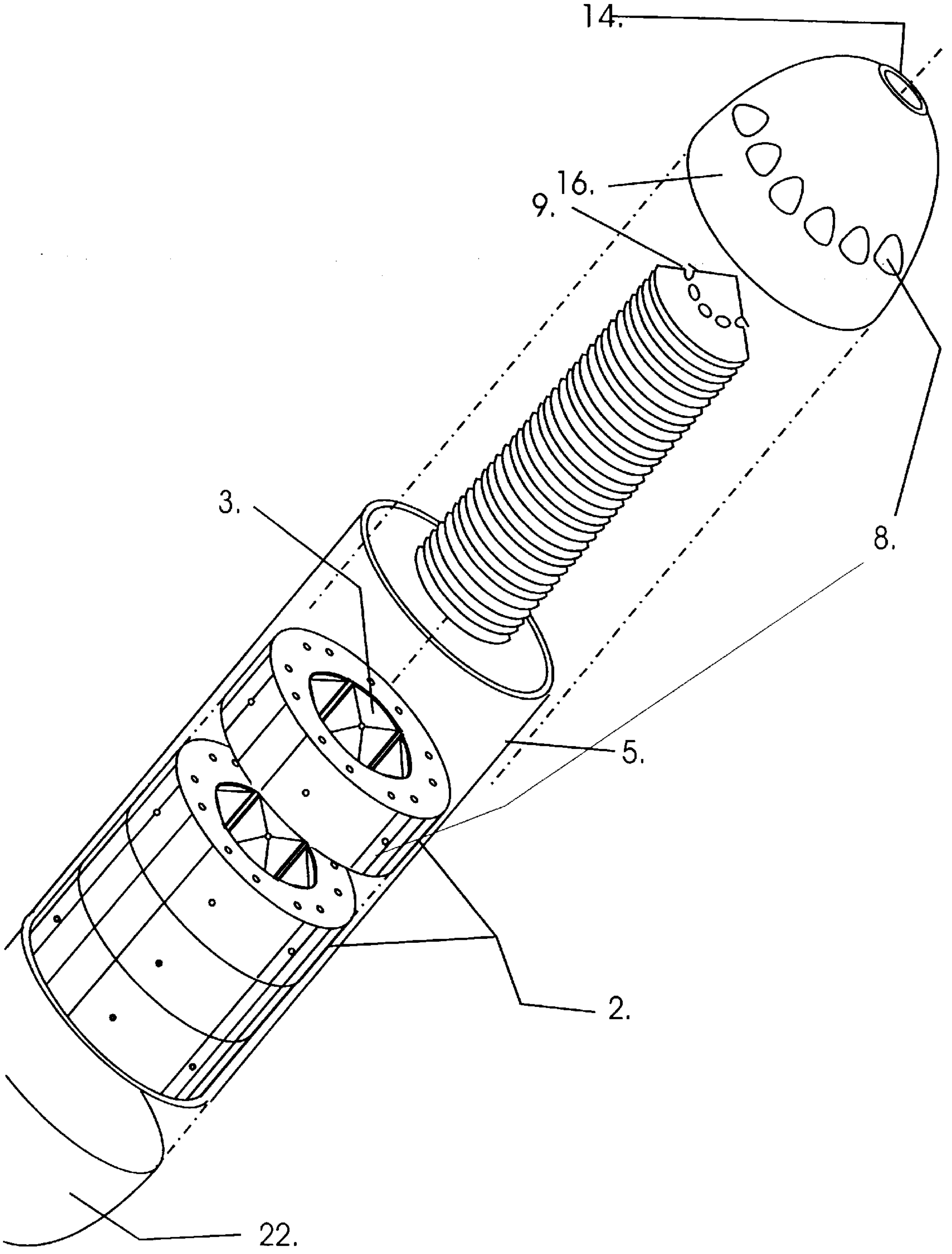
FIG. 5 A field assembly schematic, perspective view, showing four horizontally investment cast Density Screening hybrid outer wall elements surrounding a centrifuge core comprised of a tall stack of Stacked Cones. (See FIGS. 13, 14 and 15 for clarifications of, vertical, horizontal and monolithic horizontal investment cast variations of the Density Screening method's construction details).
Figure 6:
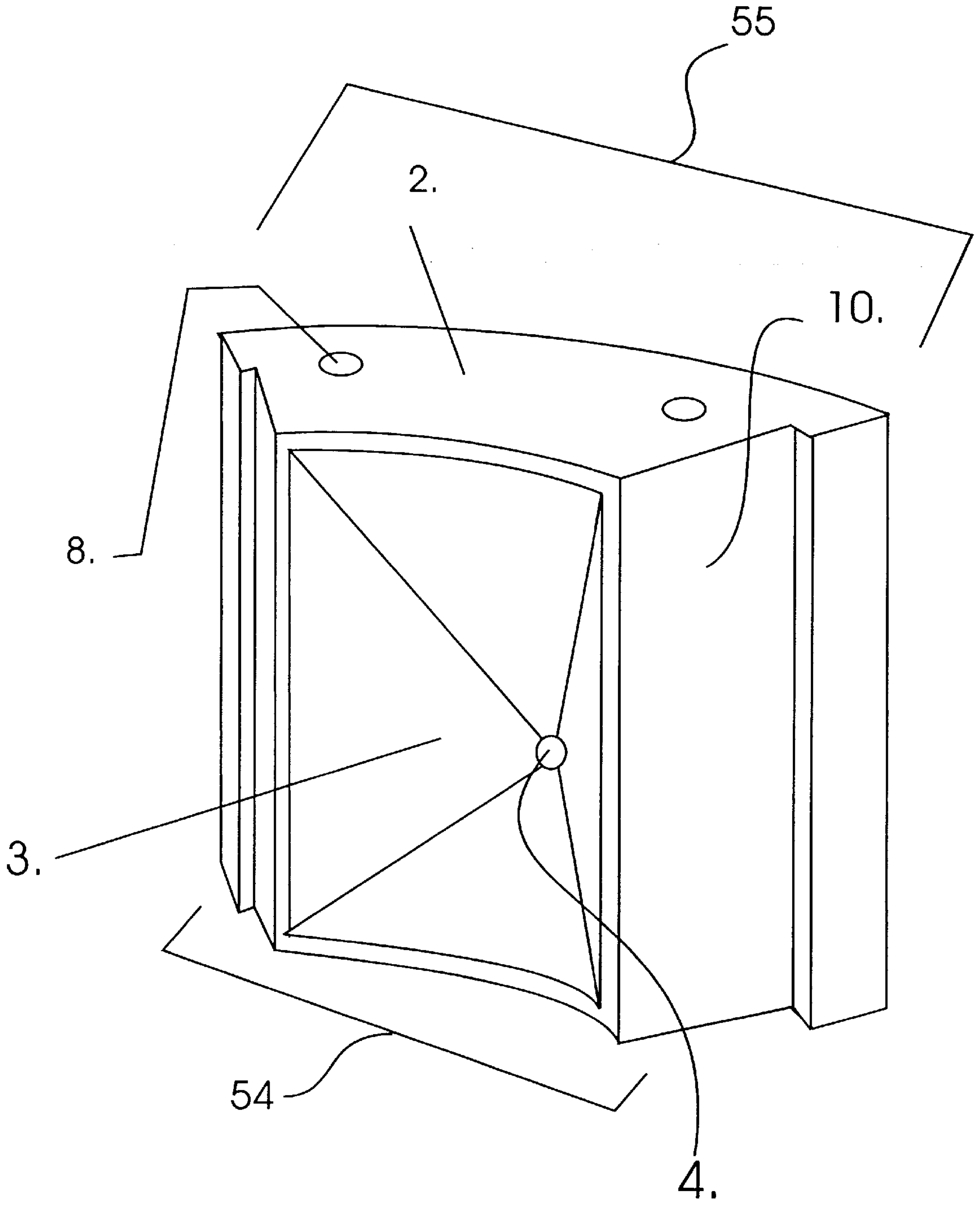
FIG. 6 Perspective view of one Density Screening method pyramidal outer wall segment, shown in isolation from other void segments which would normally all be part of a multiple void casting.
Figure 7:
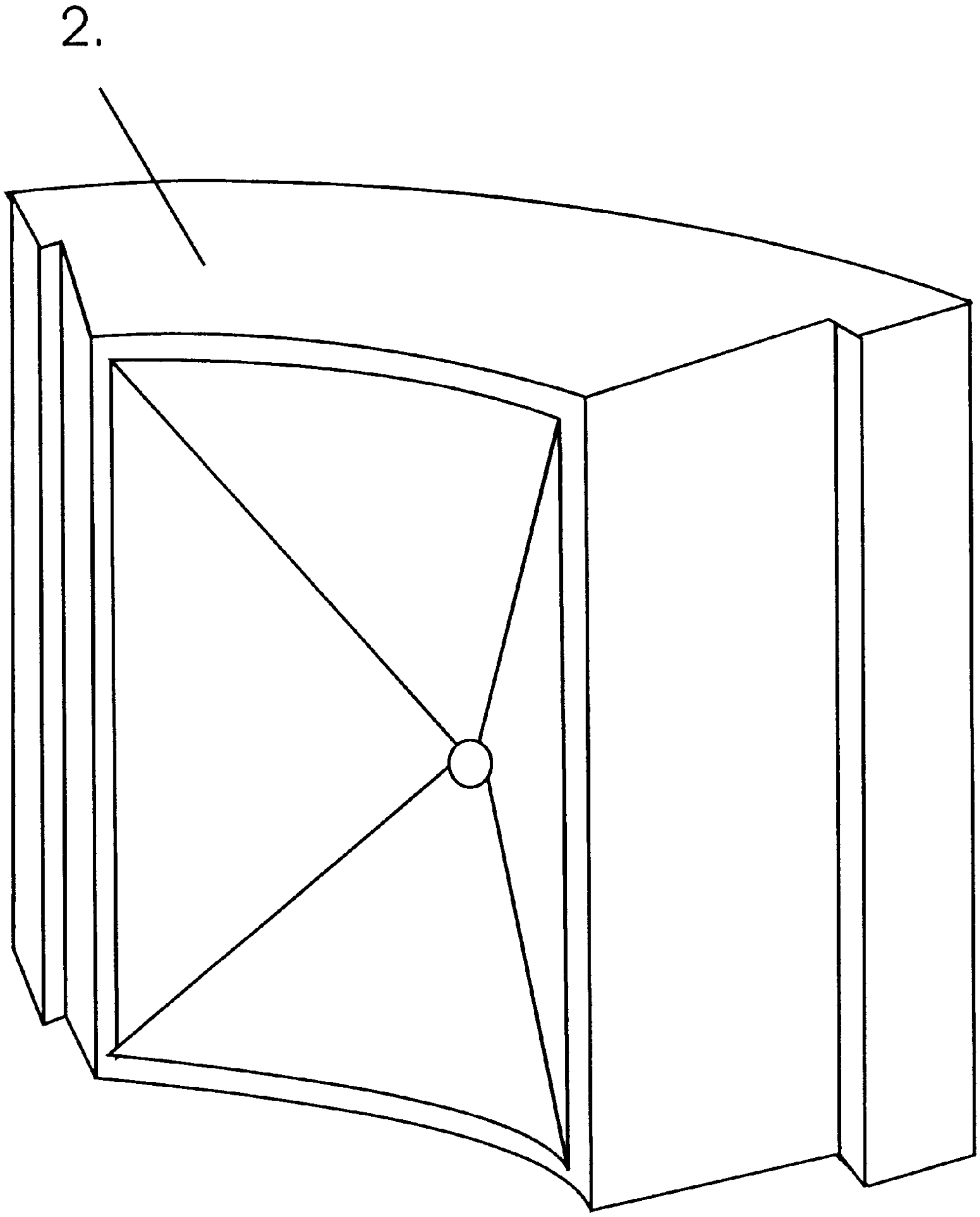
FIG. 7 Same perspective view as FIG. 6, illustrating all how all four slopes of the four pyramidal walls are symmetrical, leading to a symmetrically located exit orifice.
Figure 8:
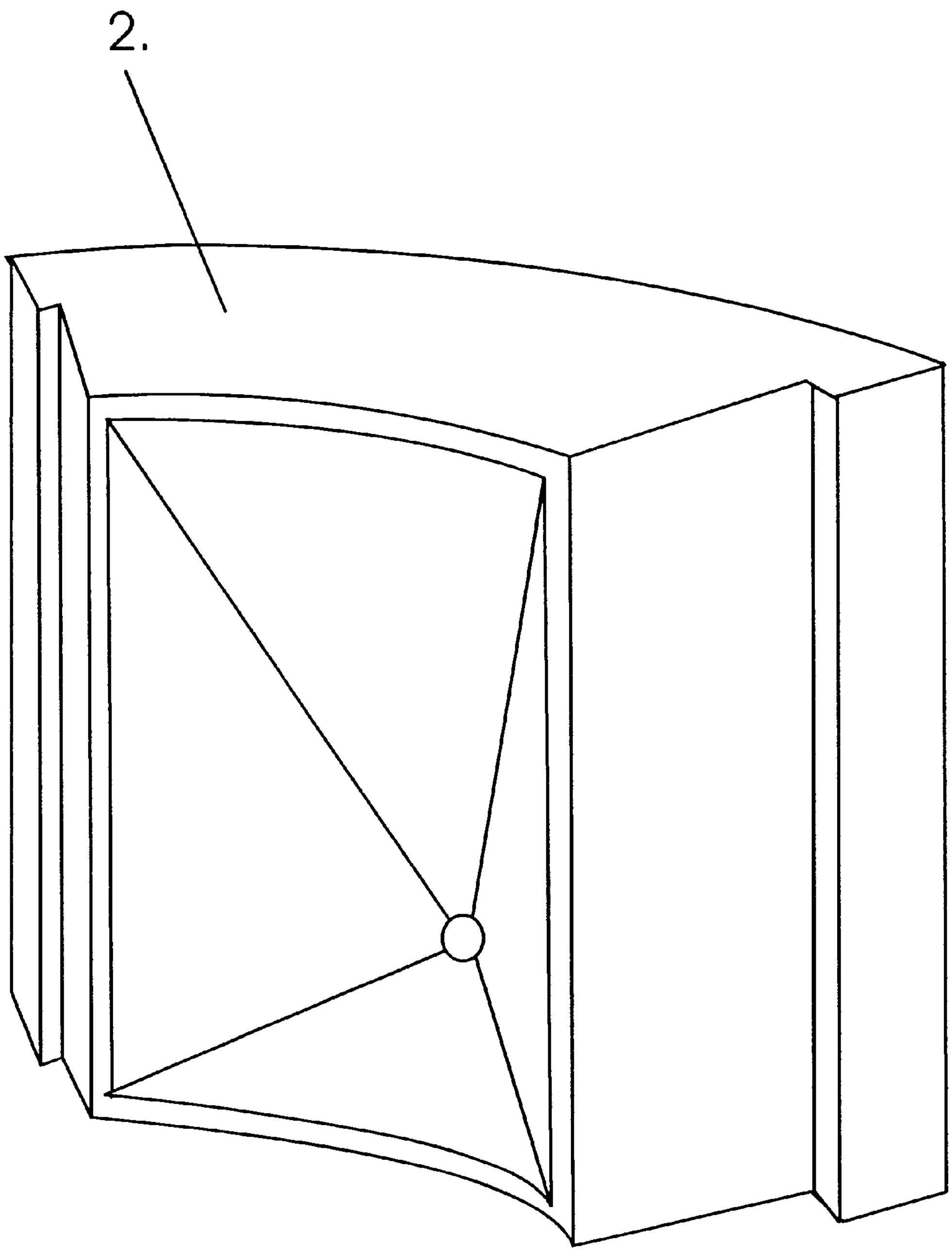
FIG. 8 Same perspective view as FIG. 6, illustrating one of several possible asymmetrical slope variations, here with left and right slopes symmetrical but lower and upper slopes asymmetrical, such that the pyramid's apex and nozzle opening lie toward the bottom of the void.
Figure 9:
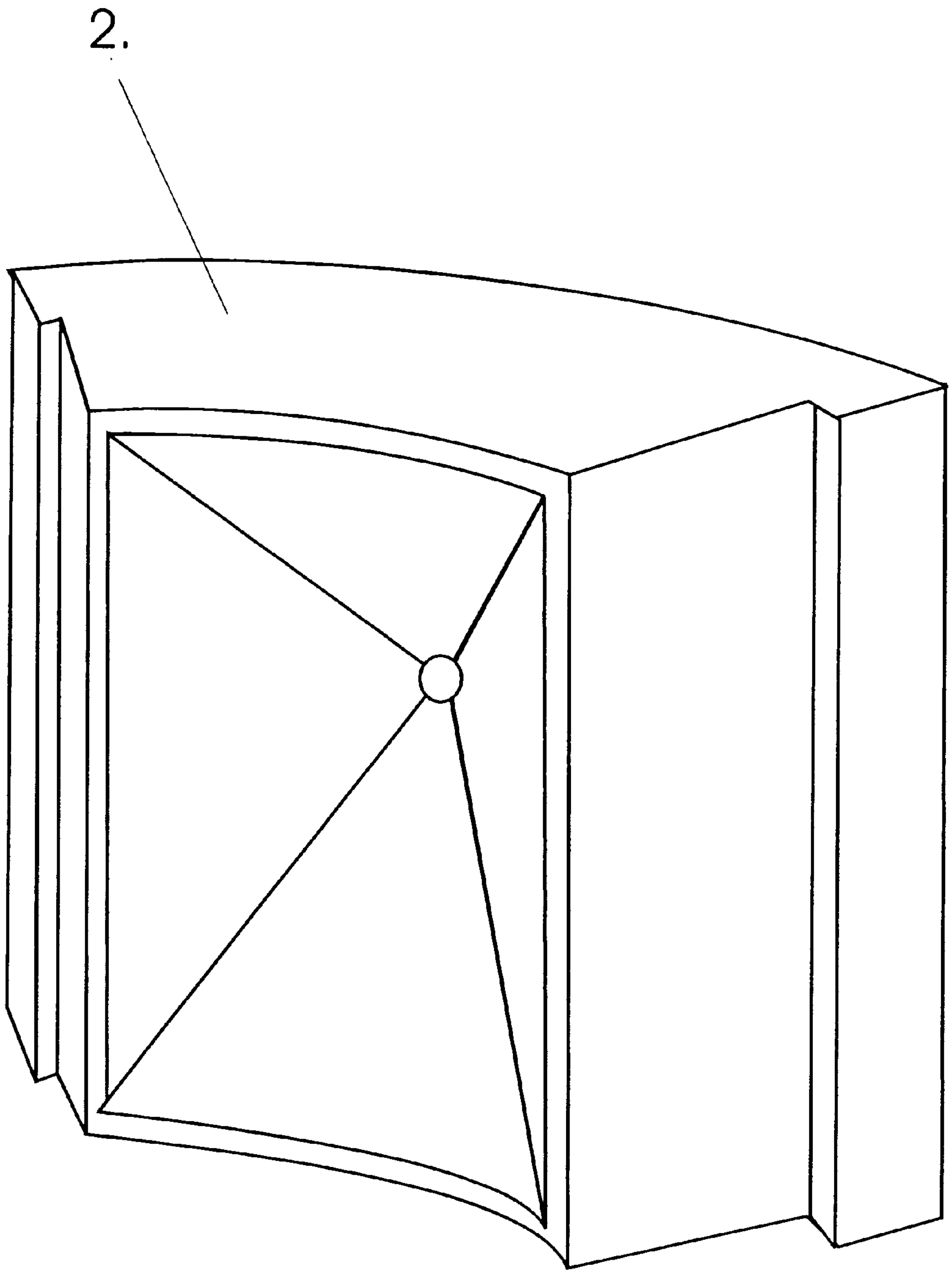
FIG. 9 Same perspective view as FIG. 6, illustrating one of several possible asymmetrical slope variations, here with left and right slopes symmetrical but lower and upper slopes asymmetrical, such that the pyramid's apex and nozzle opening lie toward the top of the void.

FIG. 4 shows a perspective, cut-away view of a Density Screening outer transport enclosing wall designed to surround a modified stacked cone type centrifuge core. As always, the Density Screening transport method outer wall is comprised of vertically stacked circular arrays of pyramidal (in this example) heavy particle capturing voids, each of which void leads outwards, or gravitationally, downwards, to an exit nozzle. Such an outer enclosing transport wall may be comprised of any number of vertically stacked bands, to achieve enclosure of centrifugal cores of any practical length, so as to optimize the residence time for such a device.

This in itself offers a novel and innovative new advantage, permitting long narrow devices offering high residence time in combination with the known separating power of stacked cones. Because of its profusion of small sloped transport voids, the Density Screening outer wall method permits for the first time the design and construction of very tall or long stacked cone cores. Previously, using traditional cone centrifuge design with a single large heavy material collecting beltline bulge (see "Objects and Advantages" ), there were severe practical limits to height of a cone stack. The higher the cone stack (the more stacked cones), the broader the collecting bulge had to be; energy efficiency decreases as the diameter grows.

Major Variability in Embodiment Geometry Design

The Density Screening method for surrounding centrifugal cores of various types with a thick-shelled wall, comprised entirely of pyramidal or conical voids, affords unusual design flexibility along several different parameters, depending on the types of novel construction materials used (see "Major Variability in Embodiment Construction Methods," below). For example, a Density Screening method enhanced centrifuge may be of varying diameters, from as small as five inches to as broad as 30 inches or more. Similarly, depending on the residence time desired for a given fluid separation problem, a Density Screening method enhanced centrifuge can be of any practical length, since the length of the outer transport and collecting wall is simply achieved by stacking successive bands of annular collecting voids on top of one another.

The specific design variables for a given Density Screening outer transport wall will be subject to and guided by both computer fluid dynamic modeling and hands-on prototype development for each specific fluid separation problem. Another such design variable is the actual geometric configuration of the voids themselves to best solve a given fluid separation transport problem. FIGS. 6 through 12, for example, show a few of the symmetrical and asymmetrical pyramidal and conical void shapes requiring further testing, some or all of which will turn out to be the ideal collection, transport and vorticity-minimizing shapes for different particle types, for different gravity ranges, for different fluid compositions, and for different types of centrifuge cores, as well as for combinations of these with other design and process variables. The depths and thus the corresponding slope angles of the voids in a given Density Screening transport wall are also highly variable and adaptable to specific separation problems.

Figure 13:
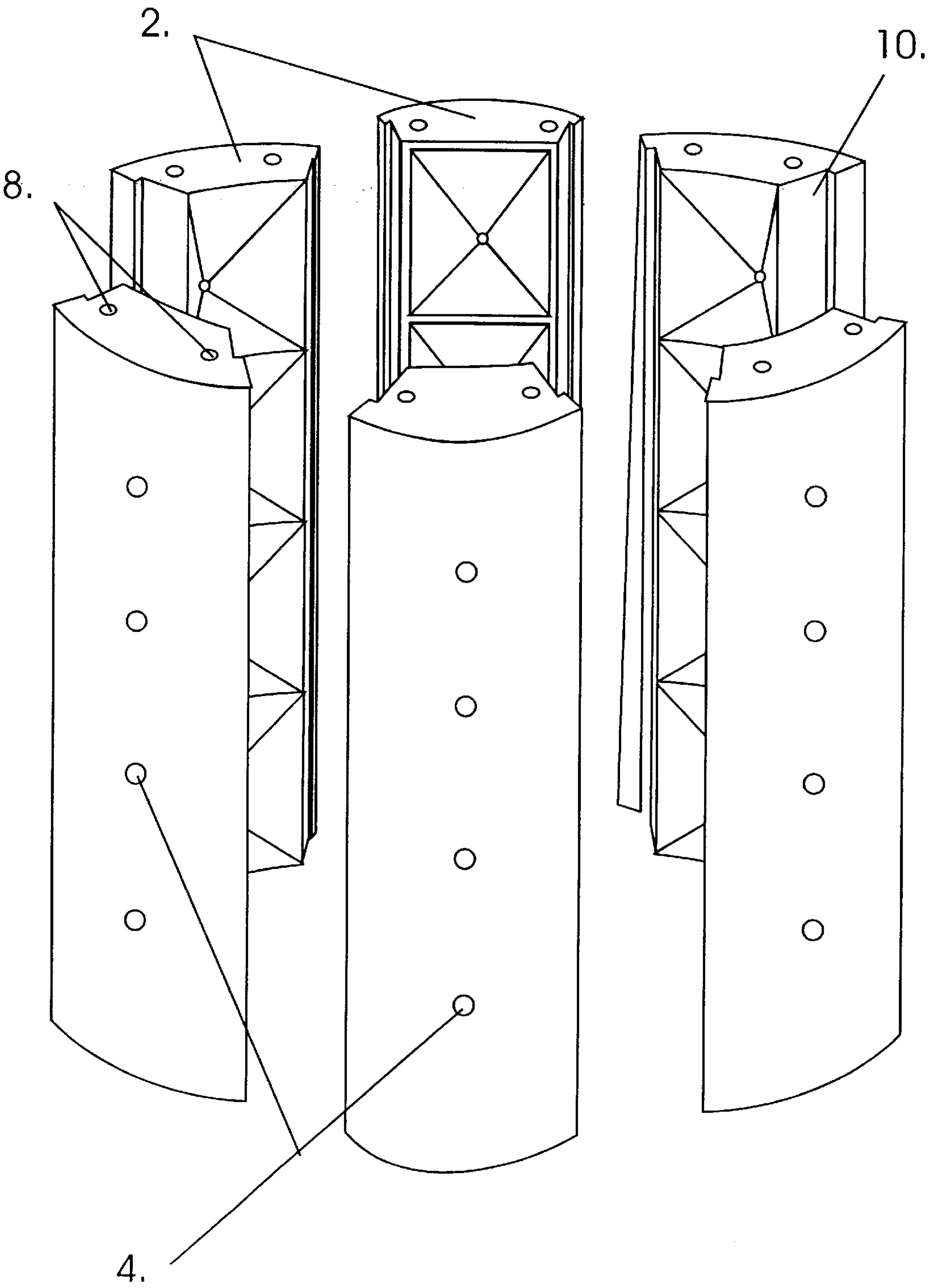
FIG. 13 Perspective view of VERTICALLY CONFIGURED in vestment-cast Multiple void outer wall segments, in this example for a Density Screening outer transport wall having six pyramidal voids per horizontal enclosure band and being four such horizontal bands high, thus comprised of six vertical castings with four vertically placed voids per casting. Note that many variations in the number of pyramidal voids per horizontal layer, and in the number of horizontal layers used for a given outer wall are possible, dictated by overall device parameters such as type of centrifugal core, volume of fluid to be processed, types of particles, etc.
Figure 14:
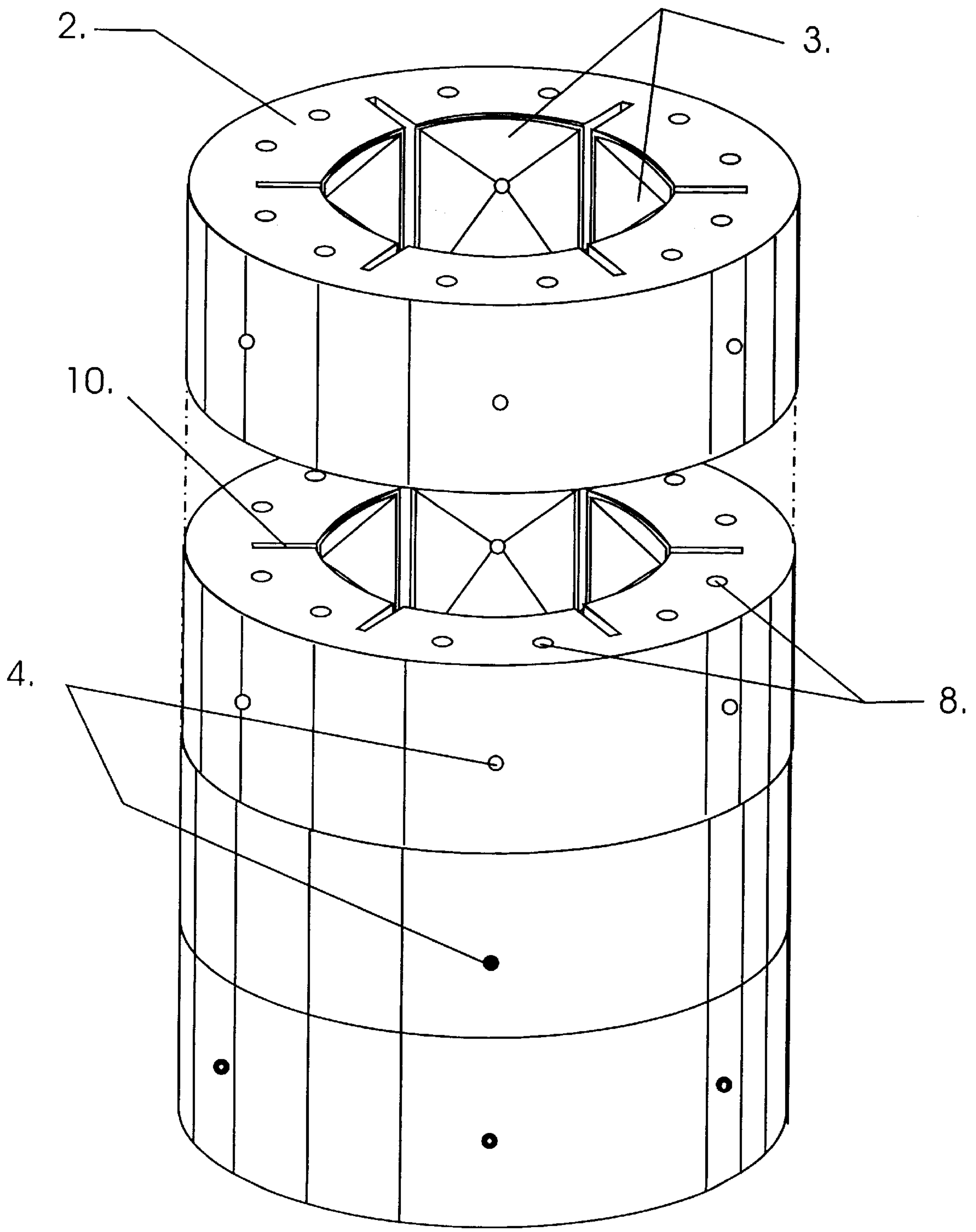
FIG. 14 Perspective view of a HORIZONTALLY CONFIGURED investment-cast multiple void outer wall segment, in this example for a Density Screening outer transport wall having six pyramidal voids per horizontal enclosure band. Note that many variations in the number of pyramidal voids per horizontal layer and also in the number of horizontal layers used for a given outer wall are possible, dictated by overall device parameters such as type of centrifugal core, volume of fluid to be processed, types of particles, etc.
Figure 15:
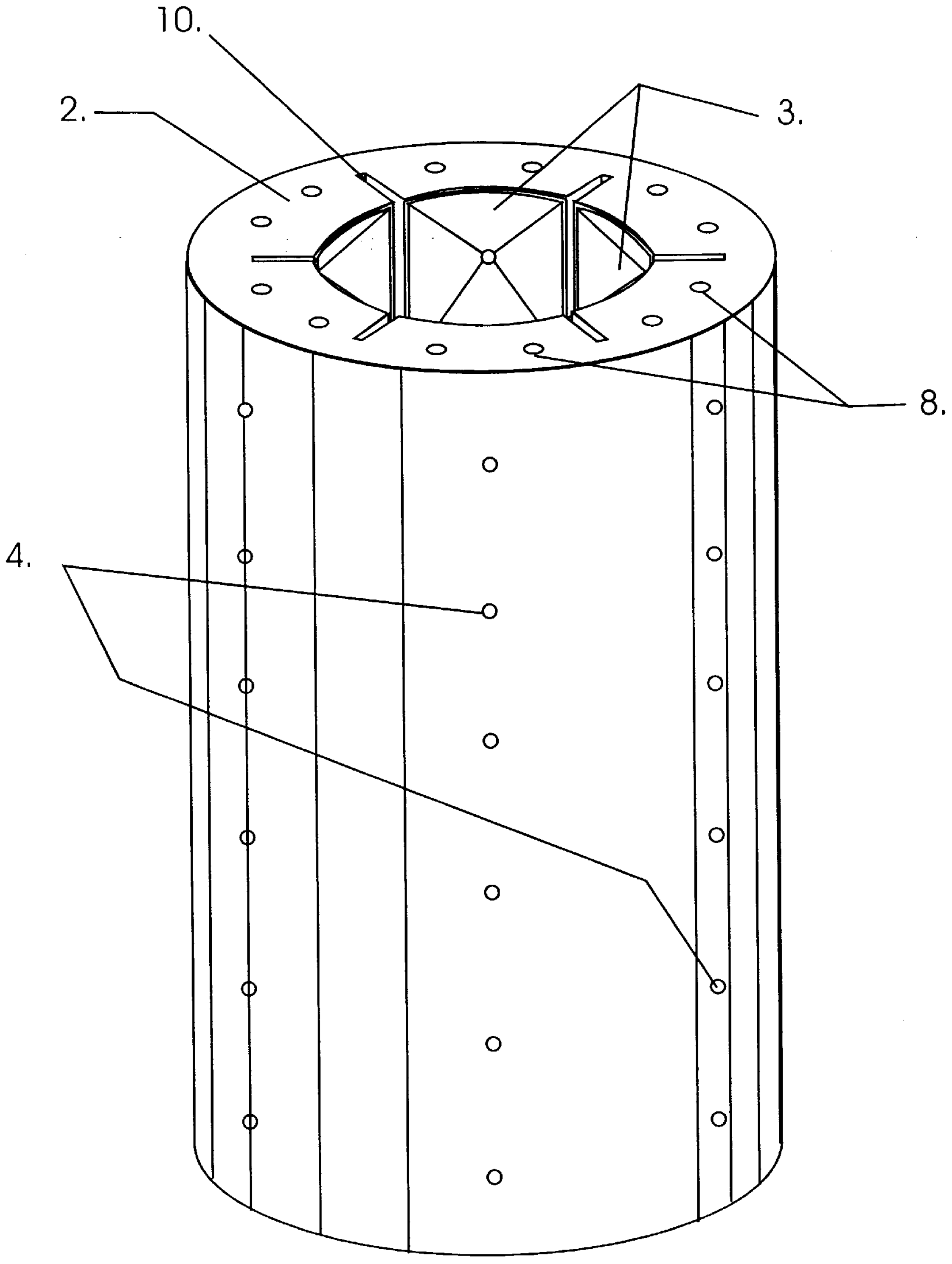
FIG. 15 Perspective view of a monolithic (one piece), investment-cast multiple void outer wall in its entirety, in this example for a Density Screening outer transport wall again having six pyramidal voids per horizontal layer. Note that many variations in the number of pyramidal voids per horizontal layer and also in the number of horizontal layers used for a given outer wall are possible, dictated by overall device parameters such as type of centrifugal core, volume of fluid to be processed, types of particles, etc.

Finally, numerous actual casting and materials combinations and assembly schemes have already been explored, developed in Computer Aided Design, and to various degrees, physically shaped and evaluated. Three such outer wall void casting assembly schemes are presented here as FIG. 13 (vertical castings), FIG. 14 (horizontal castings) and FIG. 15 (monolithic or one piece casting). Many other methods for constructing the multiple void Density Screening outer transport walls also exist and will be explored. Because of the huge variability of end uses, and combinations with various centrifuge core types, there is no one initial "device" to present for patent; instead there is a design universe represented by the Density Screening method, as presented in this application.

Substantial Variability in Embodiment Construction Methods

As stated previously, the inventors have explored and devised multiple physical means of construction for Density Screening outer transport walls, via the combining in hybrid fashion of multiple material and manufacturing technologies developed across several fields of material science developed since the 1970's. To the inventors' best knowledge, none of these new, but nonetheless prior art, materials and fabrication methods, either singly or in the novel hybrid combinations to be documented in subsequent device patents, appear at all in prior centrifuge art, which relies almost exclusively on cast and carved steel, steel alloys or titanium metals for nearly all centrifuge components.

Figure 16:
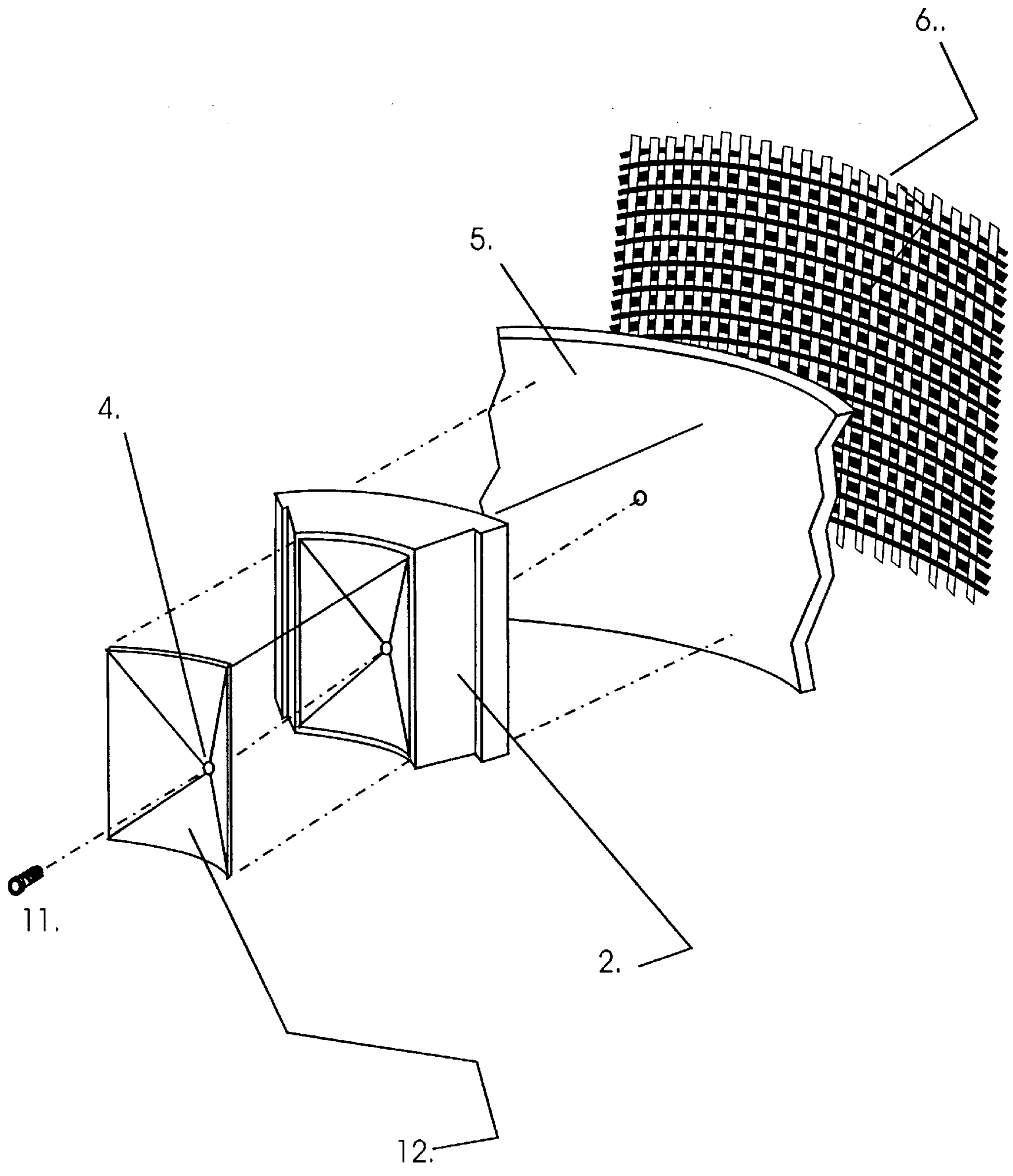
FIG. 16 Perspective and cut-away view of the hybrid technology construction approach in the design and fabrication of a Density Screening outer transport wall, reduced for clarity to a single pyramidal void segment, and showing a ruby, sapphire or diamond orifice nozzle (Part 11), an investment cast ceramic or aluminum compression-load transfer casting (Part 2), an outer shape-forming stainless steel cylinder or Mandrill (Part 5), all enclosed by a filament wound outer wrap (Part 6).

FIG. 16 shows but one such hybrid combination of new technology construction methods applied to the construction of a Density Screening outer transport method wall. Off-the-shelf ruby, sapphire, diamond or other hard-material nozzles (part 11) of varying sizes and orifices combine with an ultra hard wear surface. In FIG. 16 this might be a Positive Vapor Deposited sapphire coating on an aluminum stamping, part 12), backed with a compression load-transferring casting of lightweight aluminum, ceramic or a myriad of other dynamically balanced material (part 2), enclosed in a stainless steel shape-holding shell (part 5) which also serves as a mandrill for filament winding, all of which is then enclosed in a resin-adhered, filament wrapped layer of kevlar (aramid), carbon or hybrids of these and other hoop-strength-providing reinforcement fibers (part 6).

In his development of the Density Screening method, the inventors have already surveyed numerous variations in materials and combinations of such materials for such hybrid construction. The utility patent hallmark of this aspect in this application is the use of wear surface technology for the high-wear (heavy particle bombardment) target areas of a Density Screening void wall, combined with the application of lightweight investment or other cast incompressible materials for centrifugal force load backing of that wear surface (and transfer of those gravitational loads outwards), additionally combined with the application of filament winding on the extreme outer wall to provide extremely high hoop or bursting strength, and also to provide maximum levels of stiffness and torsional rigidity.

The documented tensile strength of carbon filament is up to ten times that of titanium. Wrapping the outer surface of any Density Screening transport wall assembly with such filament yields the extremely significant implication of centrifuges which are up to ten times stronger than any tubal, decanter or cone centrifuges on the market, or which could be theoretically rotated ten times faster than such centrifuges without bursting, or, which provide the unprecedented design flexibility of desirable combinations of "much larger" times "much faster" centrifugal devices in every category. When combined with the pure geometry advantages outlined in the "Objects and Advantages" section, it is clear that the Density Screening is indeed a major new method of heavy material transport for the entire family of spinning centrifugal devices.

Figure 17:
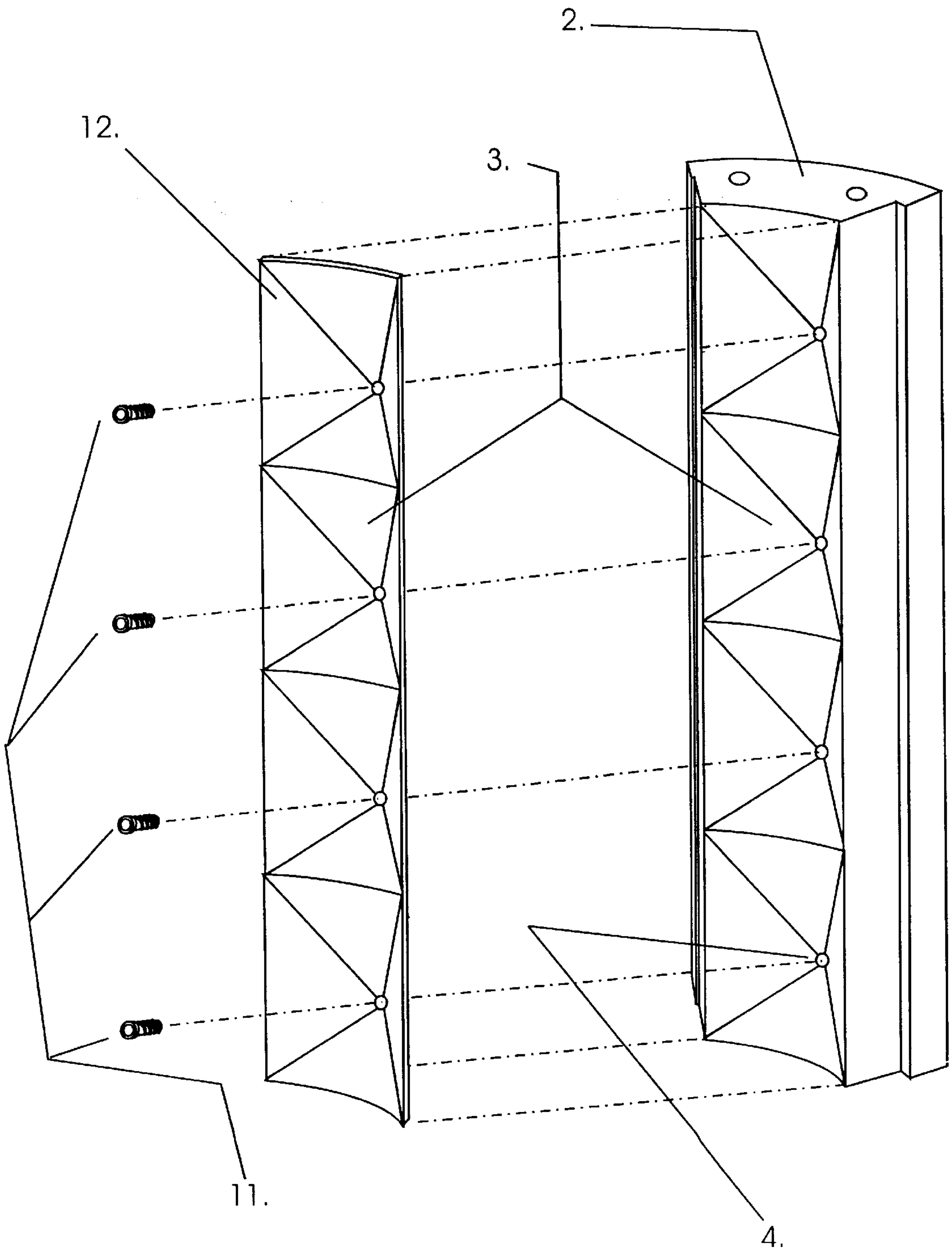
FIG. 17 Perspective and exploded view of the same vertically cast Density Screen outer wall segment as shown in FIG. 13, but with the hybrid nozzle, wear surface and compression-load-transfer elements applied from FIG. 16.
Figure 18:
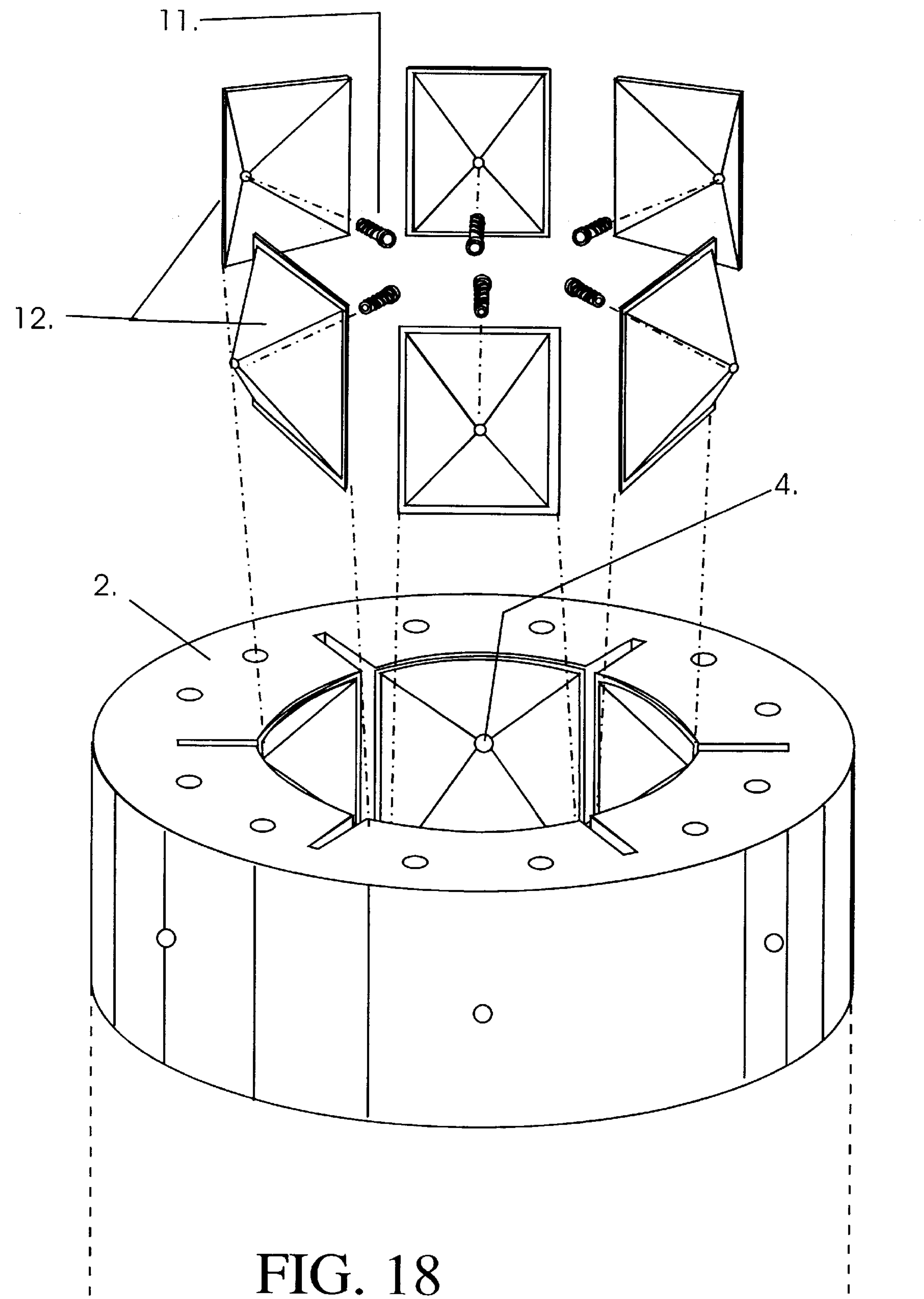
FIG. 18 Perspective and exploded view of the same horizontally cast Density Screen outer wall segment as shown in FIG. 14, but with the hybrid nozzle, wear surface and compression-load-transfer elements applied from FIG. 16.

FIGS. 17 and 18 suggest but three of the possible combinations of the aforementioned hybrid combinations of wear surface technology, dynamically balanced compression force transfer castings technology, and filament winding technology, as applied together to the vertical casting outer wall construction scheme (FIG. 17), and to horizontal and the monolithic casting wall construction schemes (FIG. 18).

The available variations for applying the surveyed novel hybridized materials technologies, in lieu of traditional cast and carved metals, for the construction of various embodiments of the Density Screening outer wall transport method, are so multifarious and so intricately related to the specific purpose for each such device so designed, that the presentation of individual detailed methods of construction is being reserved for a succession of specific device patents, to be filed immediately following this method application.

The inventors have extensively explored, prototyped and tested numerous of these means of new materials fabrication and construction, relative to their optimum mechanical combinations with existing type of centrifuge cores (tubal, decanting, stacked cone). From this work he has also already surveyed many of the advantages of each such specific physical construction hybrid with each particular existing centrifuge core type, such that some such methods and combinations have already been targeted to specific fluid separation problems, in the end-application areas of water treatment, wastewater recycling and petroleum exploration fluids recycling. Therefore, each of the forthcoming succession of specific device patent applications, will detail one such combination of selected hybrid materials construction with one particular class or design of conventional centrifuge core, often targeted to specific industry application areas.

OPERATION OF THE INVENTION

Preferred Embodiment

Figure 19:
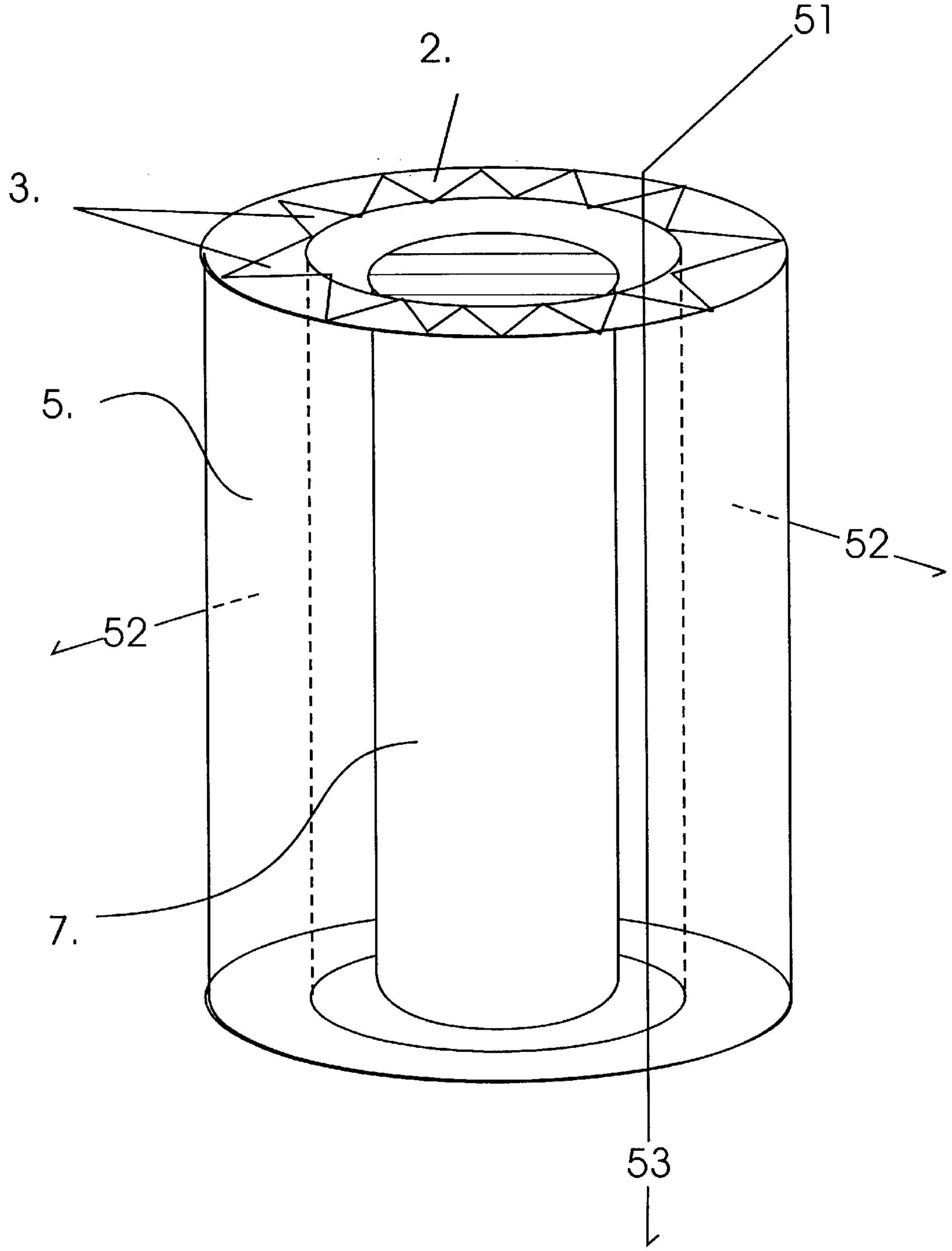
FIG. 19 Perspective, partially cut-away schematic of a Density Screening transport method outer wall surrounding a solid Tubal Centrifuge core, and further showing the basics of fluid flow, in from the top of the device through the work area between the inner core and the outer shell wall, with heavy materials thrown out into the pyramidal or conical voids, and lighter, clarified materials flowing lengthwise down and out of the center of the device.

FIG. 19 shows a perspective view of one embodiment of the Density Screening outer wall transport method, in this case being applied as the heavy material transport, capture and ejection method for and thus surrounding a tubal type centrifuge core.

Figure 20:
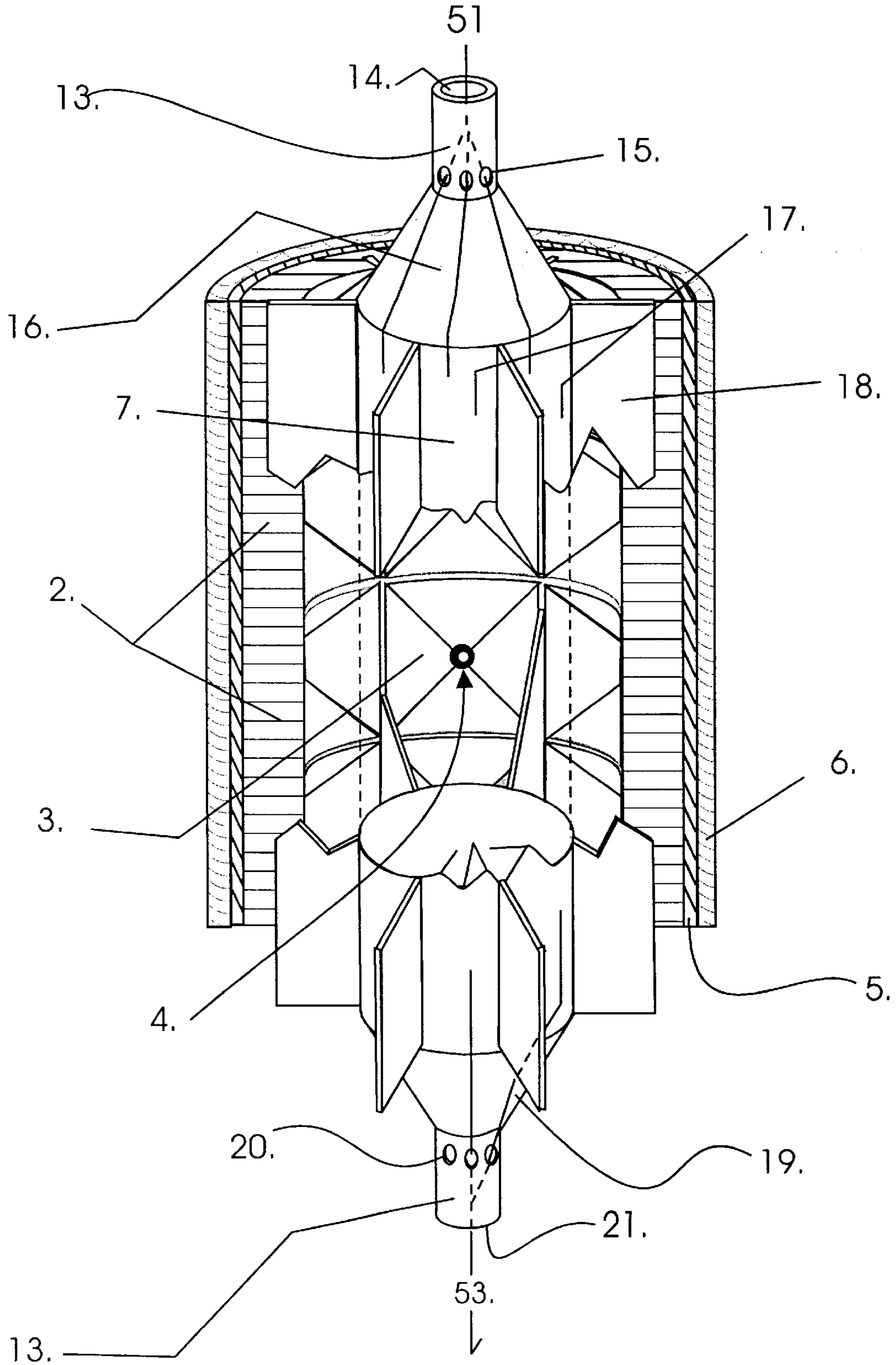
FIG. 20 Perspective, cut-away view of one embodiment of the Density Screening outer transport wall, shown surrounding and providing the transport mechanism for an enclosed Tubal Centrifuge solid core, which core has the added anti-vorticity feature (prior Tubal Centrifuge art) of vanes, creating six (in this example) proscribed vertical fluid flow channels through the fluid work area, each of which leads to one vertical row of pyramidal heavy-material collecting voids.

FIG. 20 gives a more realistic cutaway and perspective view of such a combination of the Density Screening outer transport wall method with a modified tubal, solid centrifuge core. This core has an additional feature from prior art of vertical vanes which segment the primary fluid flow into vertical columns for the purpose of reducing vorticity in the fluid work area. In FIG. 20, the primary fluid flow enters the top through a shaft inlet buildable in many different configurations, and is next splayed outwards and down by a reducing cone, to travel down a narrow-band fluid work area between a solid core and a Density Screening outer Transport wall. Since the entire assembled device (inlet and exit, transitional plumbing, central core of whatever type, plus the Density Screening outer wall) are all physically connected and are being rapidly rotated as a single unit, gravitational spin is created within the entire cylindrical device and its contained hollow cylinder of fluid, whose primary direction of travel is still downwards.

Figure 21:
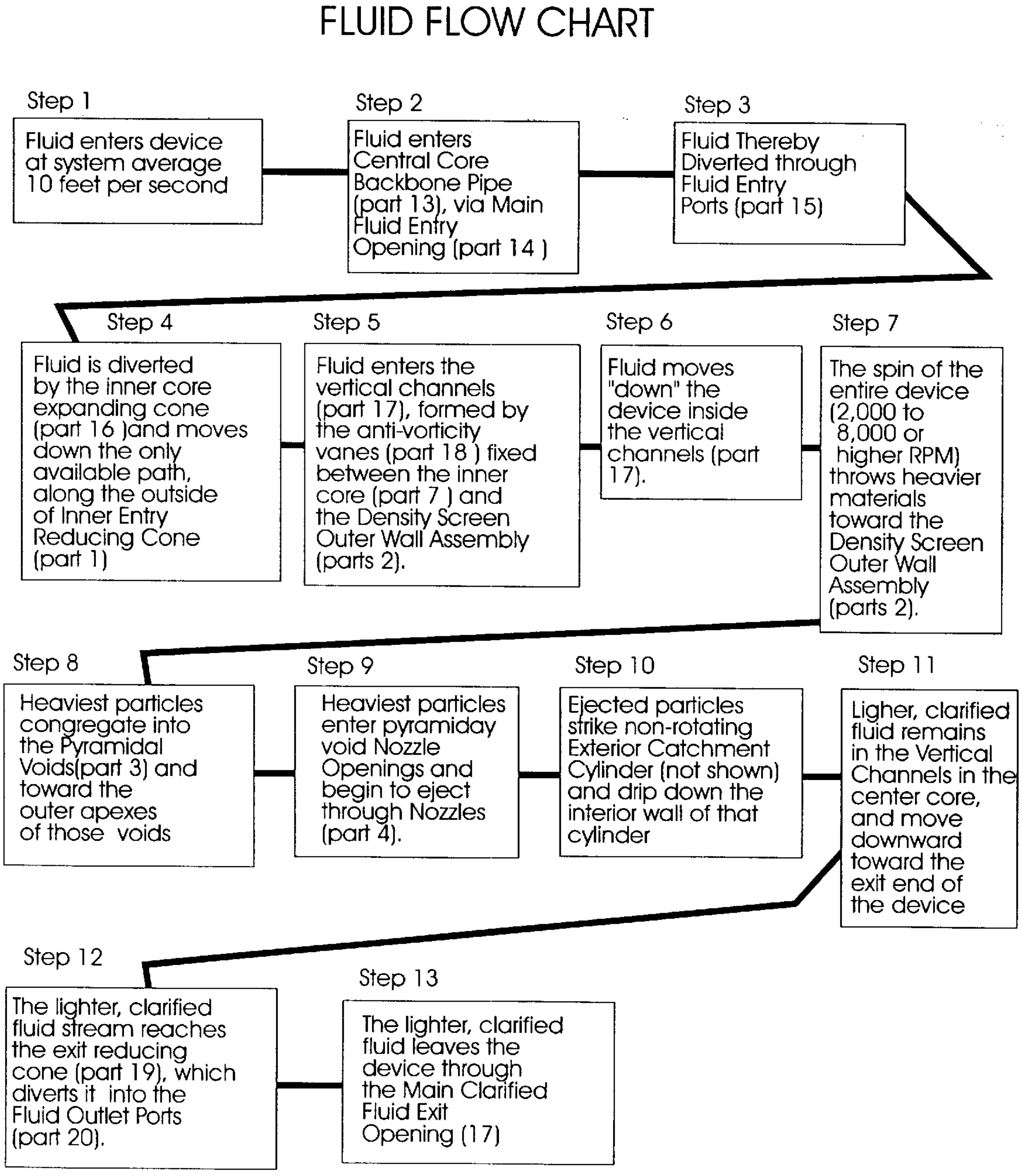
FIG. 21 Flow chart sequentially depicting the motion of fluid through the hybrid device pictured in FIG. 20.
Figure 22:
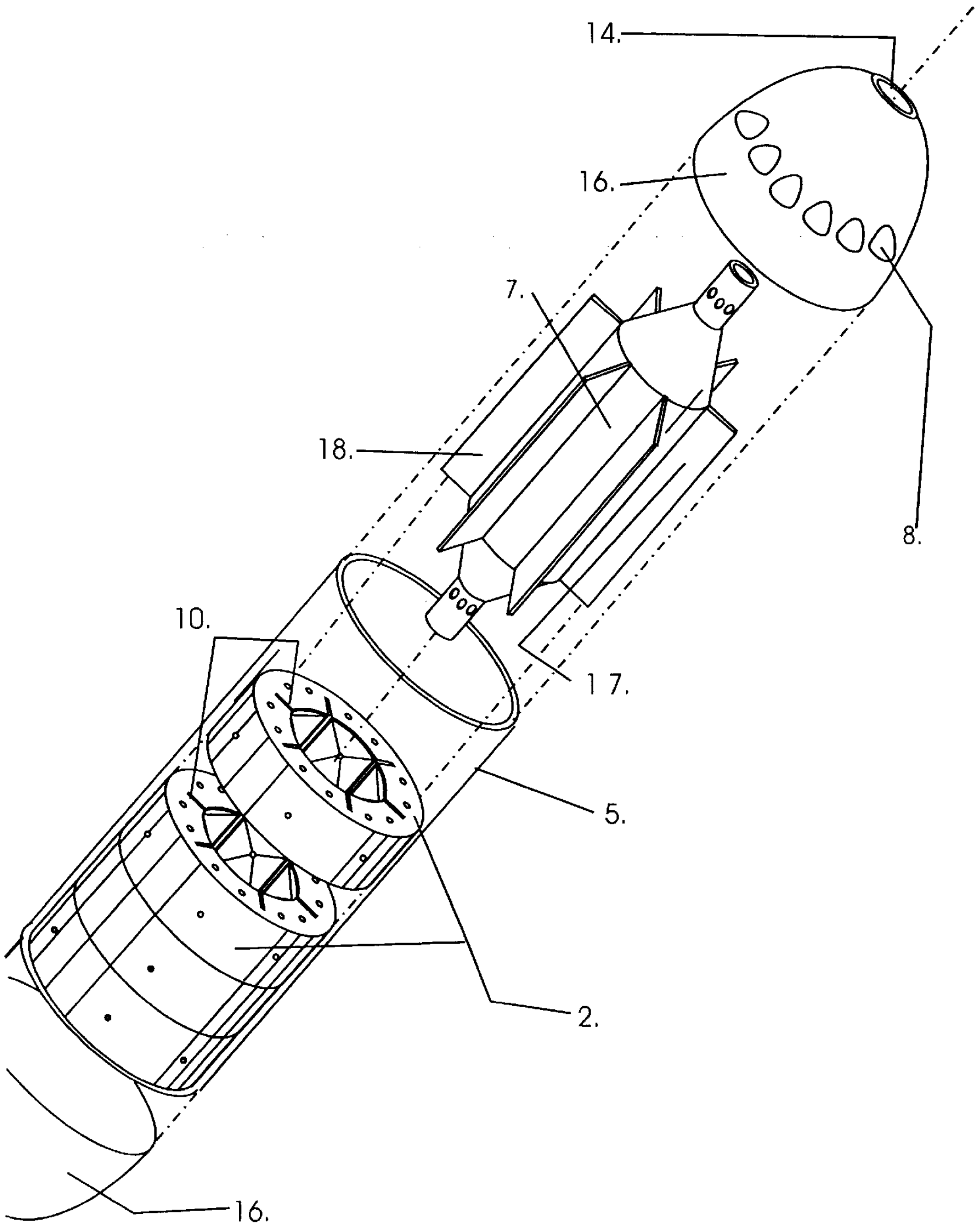
FIG. 22 A field assembly schematic, perspective view, showing four horizontally investment cast Density Screening hybrid outer wall elements, surrounding a centrifuge core comprised a tubal type core with added anti-vorticity vanes. (See FIGS. 13 and 14 for clarification of horizontal and vertical investment cast variations of the Density Screening method's construction details).

Thus in FIG. 20, while the originating fluid flow is traveling from top to bottom, centrifugal force simultaneously being applied to that flow is perpendicular it, such that gravity is pulling outward towards the Density Screening outer wall and thus into, down and through each of the pyramidal (in this Figure) voids, and out to and through the ejection nozzle in each such void. The clarified fluid, relieved of its heavier particles which have been thrown outward by centrifugal force under the original inlet flow direction and pressure, continues to travel downwards along the length of the device, where it exits through any manner of outlet designs. See simplified drawing, FIG. 19, of clarified fluid traveling down while heavier ejectants are thrown out on the perpendicular. FIG. 21 offers a more detailed fluid travel Flow Chart to accompany and illustrate FIG. 20.

It should be noted that once ejectants have been gravitationally expelled from the various nozzles which penetrate the outer surface of a Density Screening transport wall, said ejectants can be collected in a number of ways, the simplest of which is to surround the spinning centrifugal core and Density Screening outer wall with a non-rotating catchment outer cylinder. Ejectants leaving the nozzles strike this outer, non-rotating cylinder wall and drip downwards, now at one normal Earth gravity, since they are no longer spinning. No rotational energy is expended on the heavy materialst materials once they have been ejected from the Density Screening wall's nozzles.

Alternate Embodiment

Figure 10:
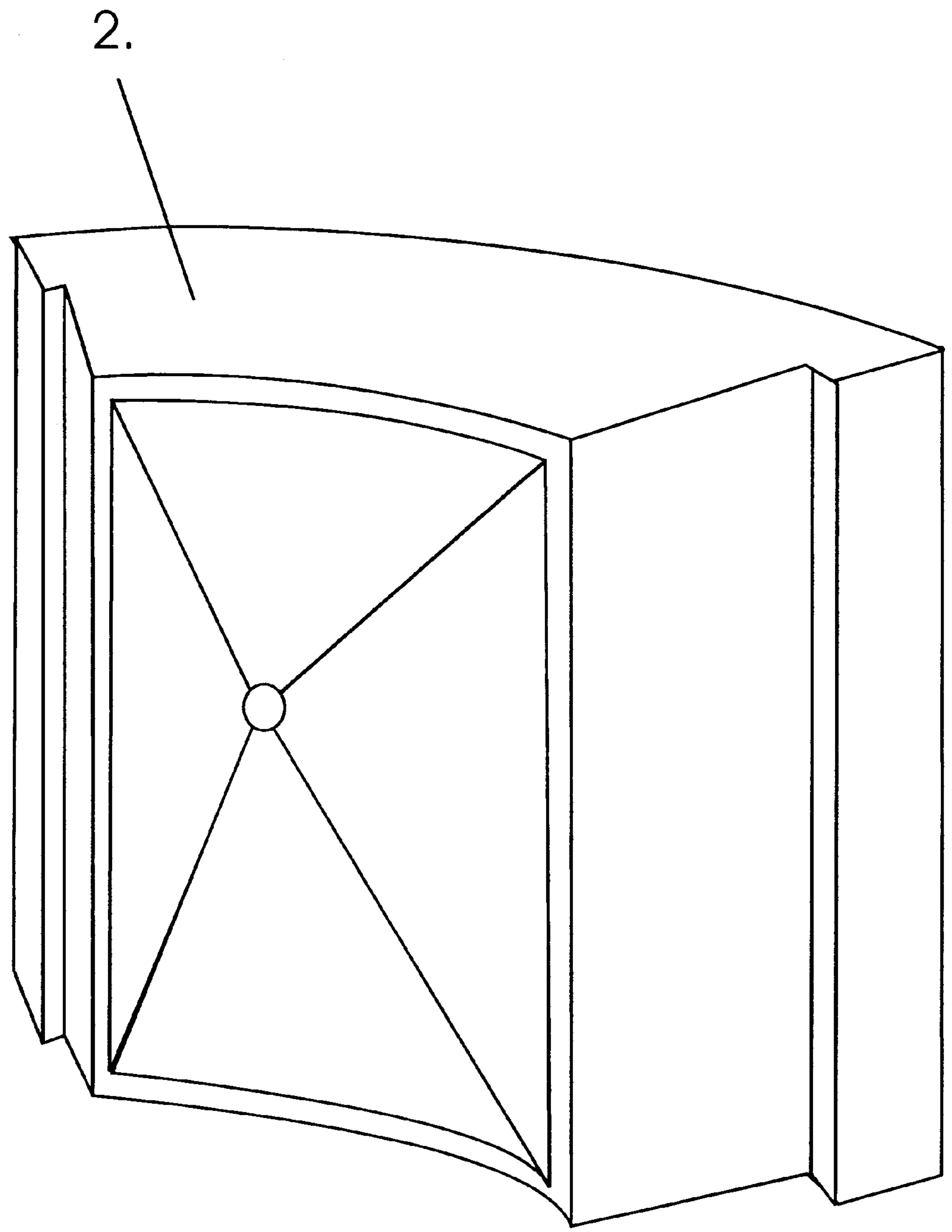
FIG. 10 Same perspective view as FIG. 6, illustrating one of several possible asymmetrical slope variations, here with top and bottom slopes symmetrical but left and right slopes asymmetrical, such that the pyramid's apex and nozzle opening lie toward the left of the void.
Figure 11:
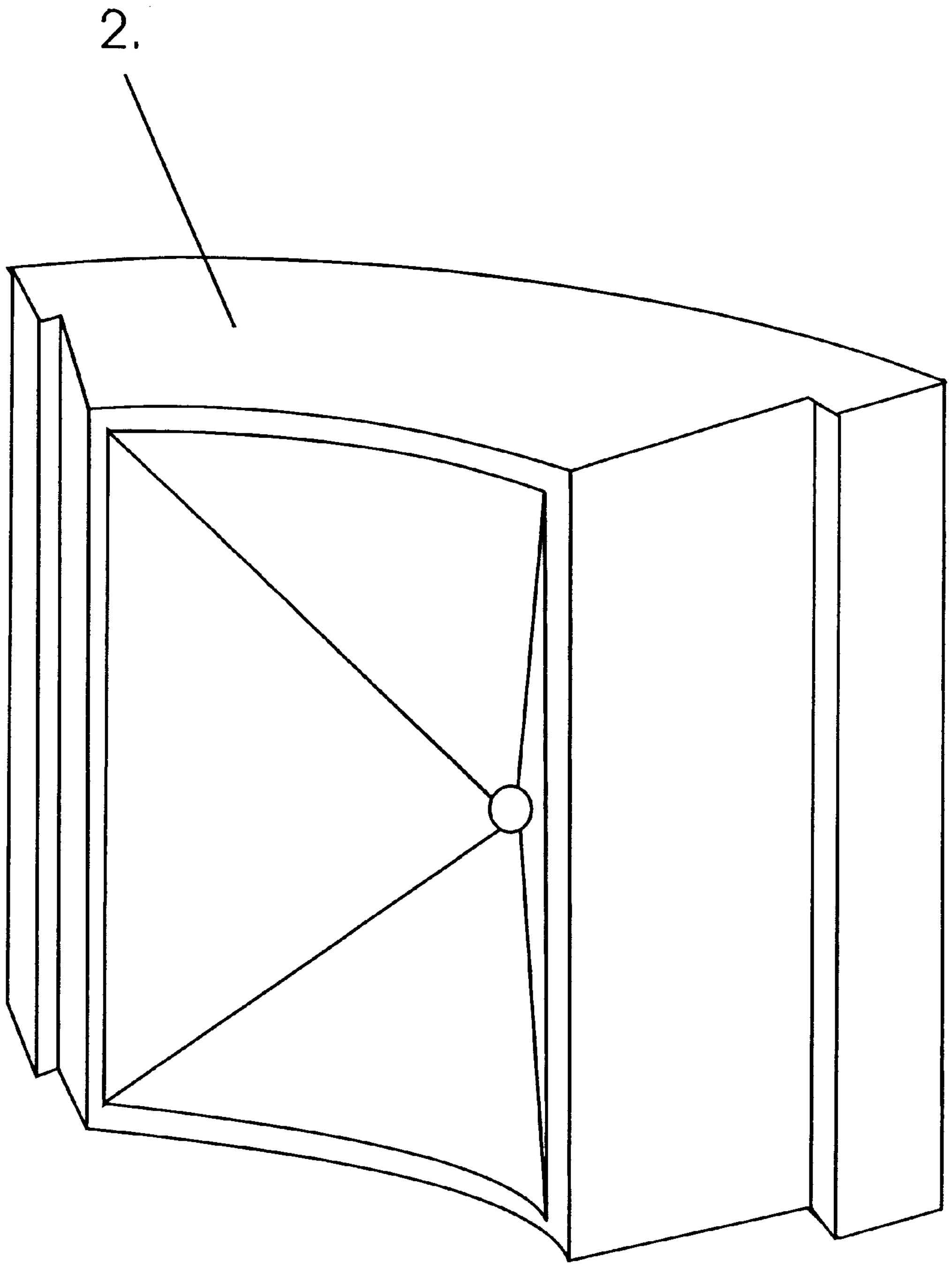
FIG. 11 Same perspective view as FIG. 6, illustrating one of several possible asymmetrical slope variations, here with top and bottom slopes symmetrical but left and right slopes asymmetrical, such that the pyramid's apex and nozzle opening lie toward the right of the void.
Figure 12:
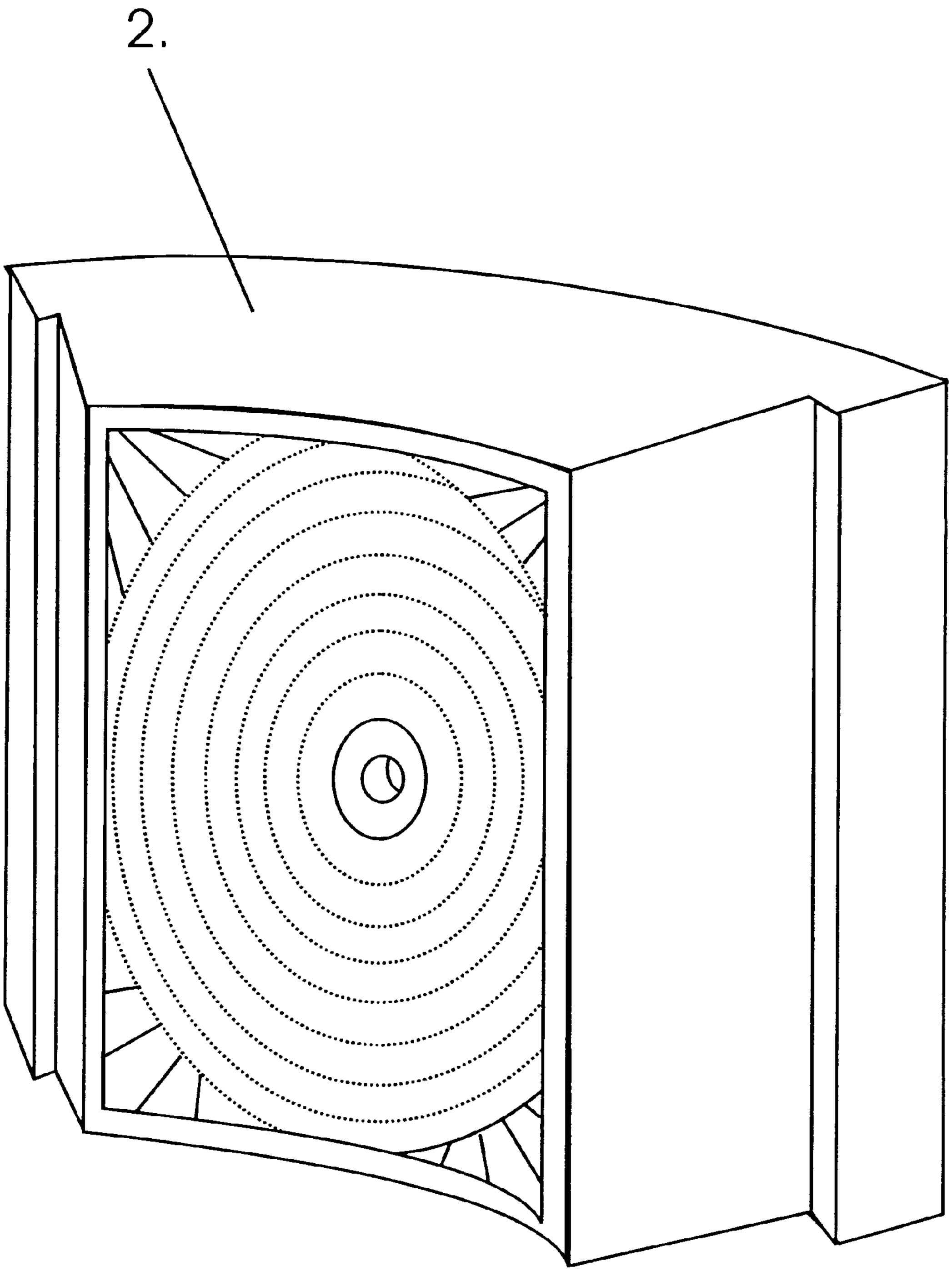
FIG. 12 Same perspective view as FIG. 6, but here showing a conical geometry substituting for the four-sided pyramidal geometry shown in FIGS. 6 through 11, legend documenting that all asymmetry variations possible with the pyramidal voids also apply to conical voids.

FIG. 10 shows a perspective view of one embodiment of the Density Screening outer wall transport method, in this case being applied as the heavy material transport, capture and ejection method for and surrounding a stack cone type centrifuge core.

Figure 23:
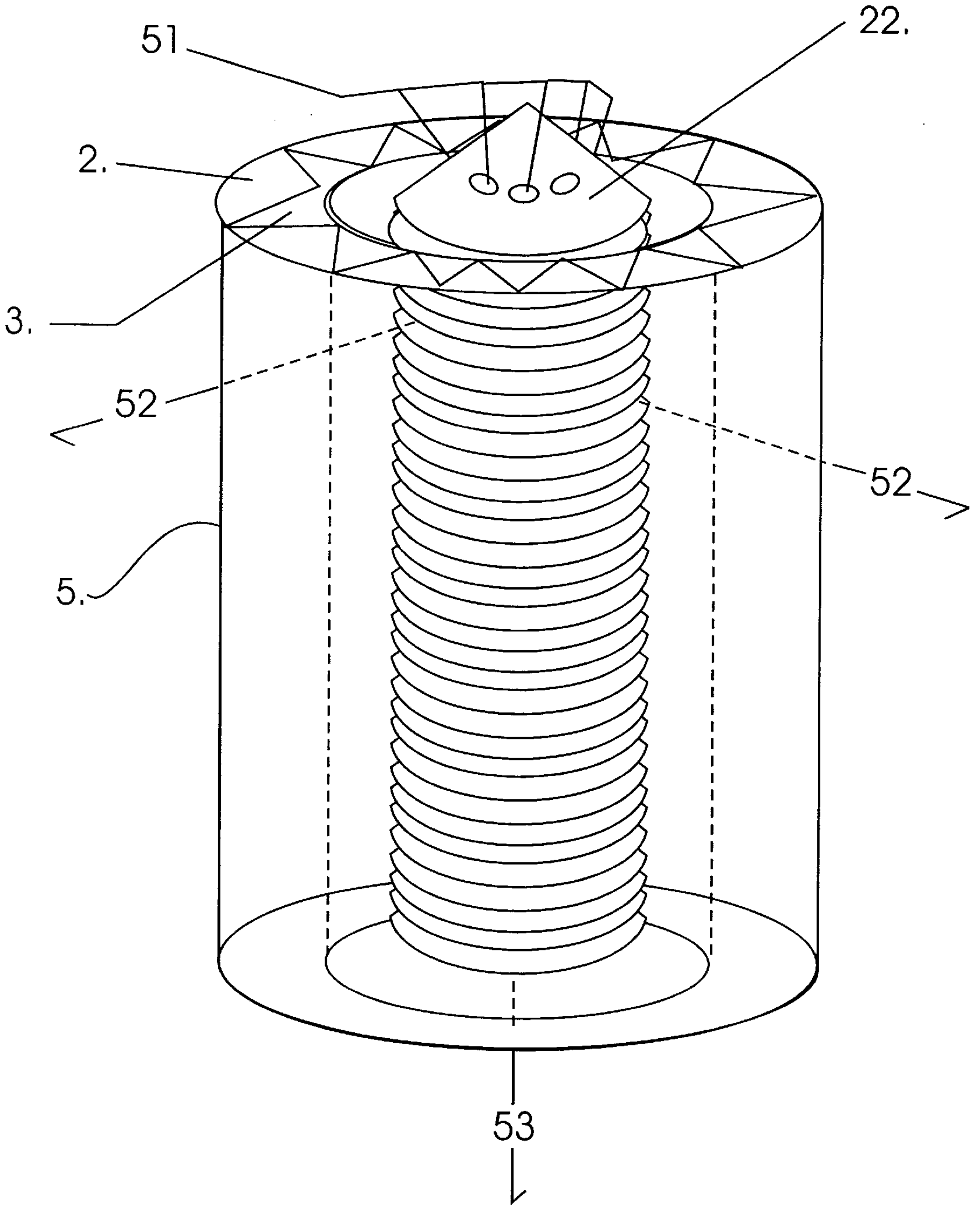
FIG. 23 Perspective, partially cut-away schematic of a Density Screening transport method outer wall, as in FIG. 8, but now surrounding a stack-cone type centrifuge and further showing the basics of fluid flow, in from the top of the device through the work area of the stacked cones with heavy materials thrown out from the exit space between every two stacked cones and into the pyramidal or conical voids, and lighter, clarified materials flowing lengthwise down and out of the center of the device.
Figure 25:
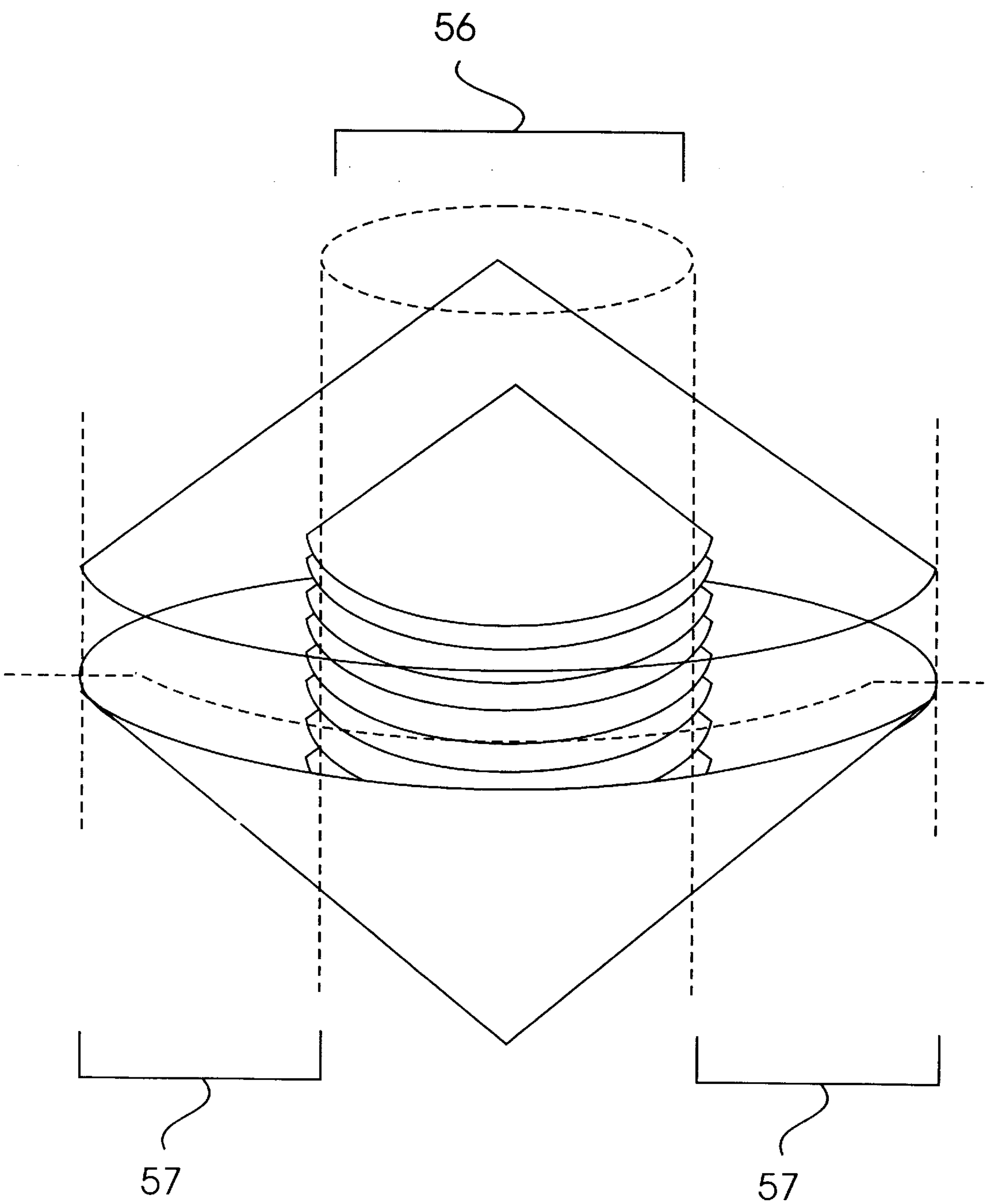
FIG. 25 (PRIOR ART)
FIG. 25. Perspective view, simplified schematic of geometry of a Prior Art Cone type Centrifuge featuring a broad diameter, heavy particle beltline collecting valley or bulge.
Figure 26:
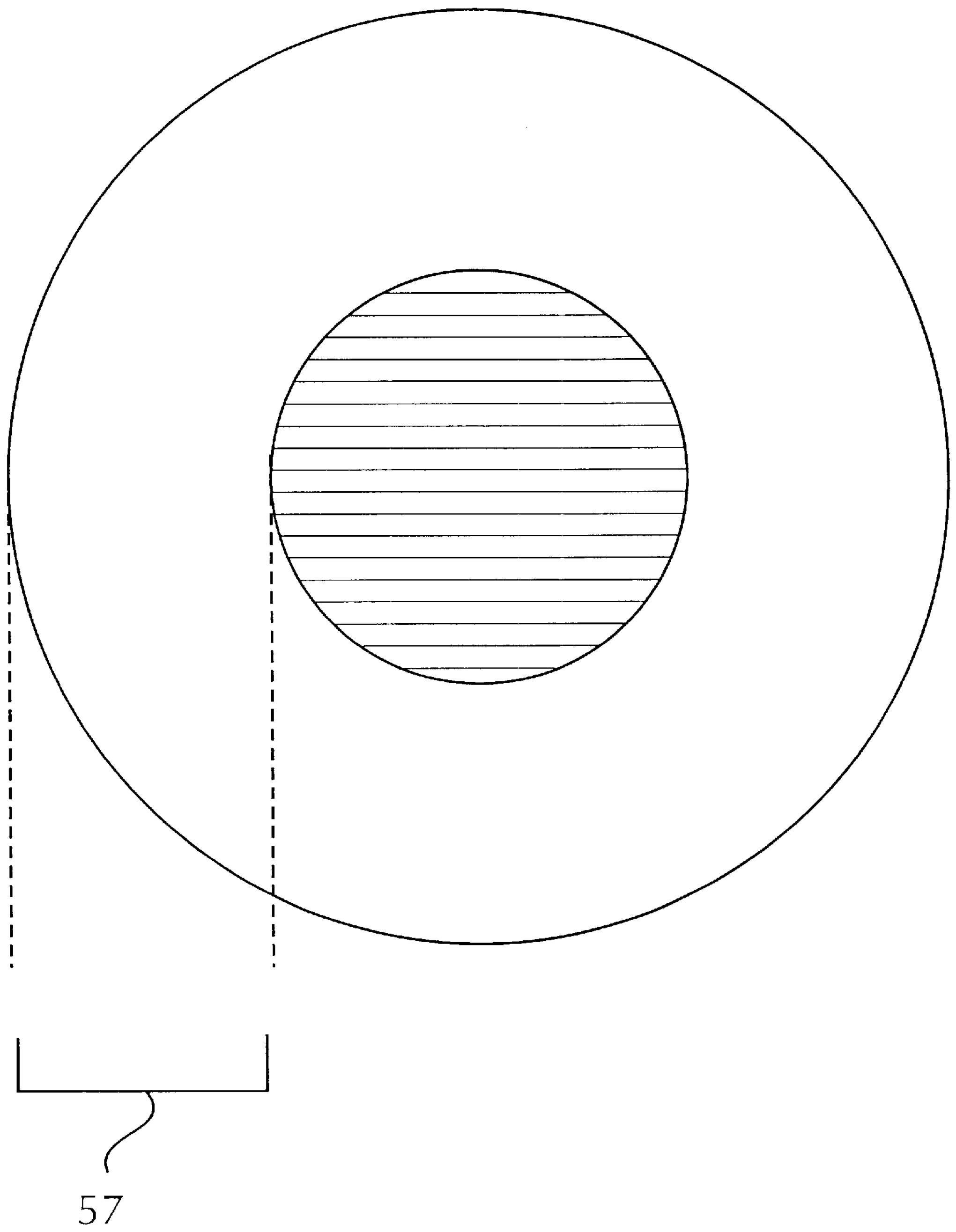
FIG. 26. Top view, simplified schematic of geometry of the Prior Art Cone type Centrifuge shown in FIG. 25.
Figure 27:
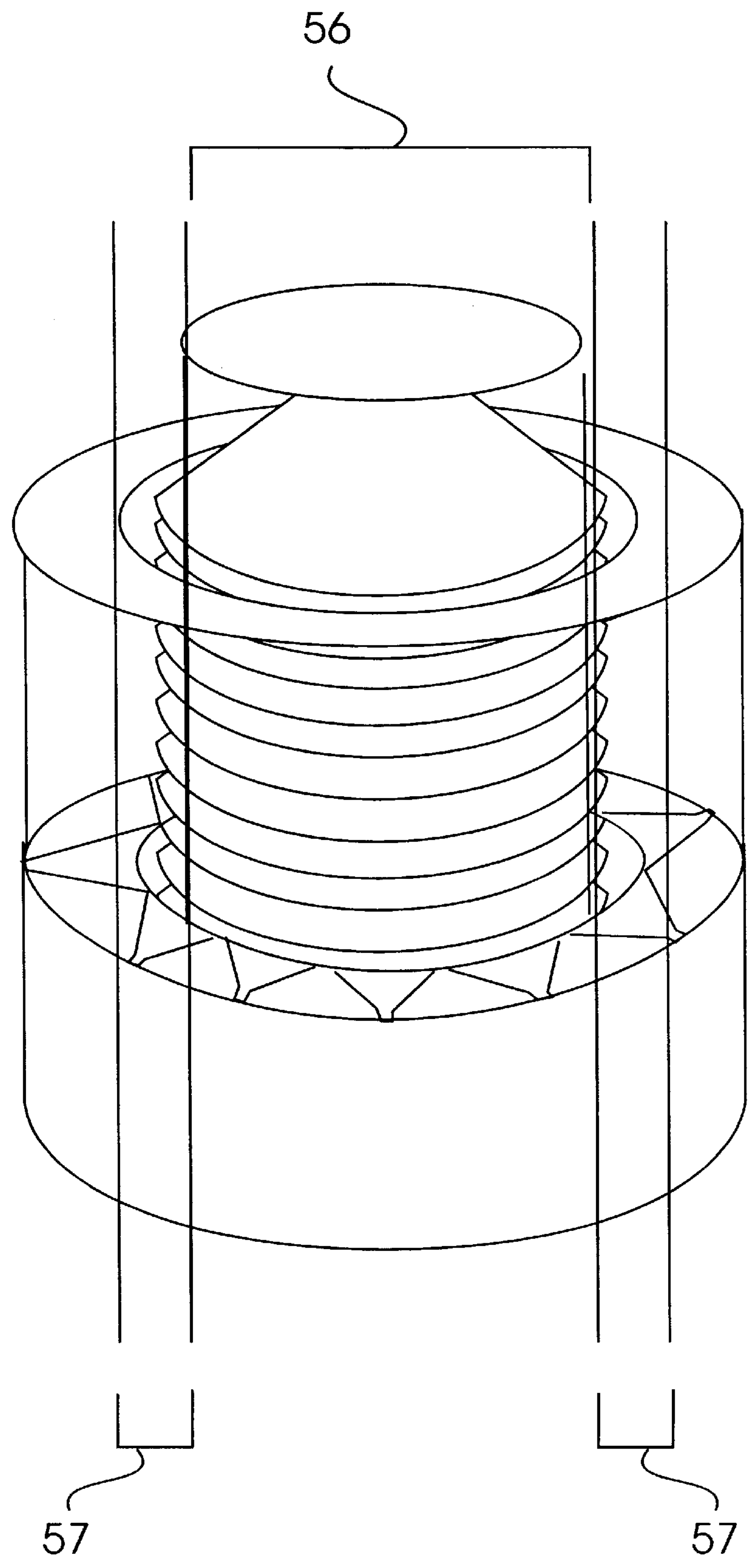
FIG. 27 Perspective view, simplified schematic of geometry showing diameter-reducing advantages of the multitude of smaller, multiply-dispersed collecting voids in the Density Screening method.
Figure 28:
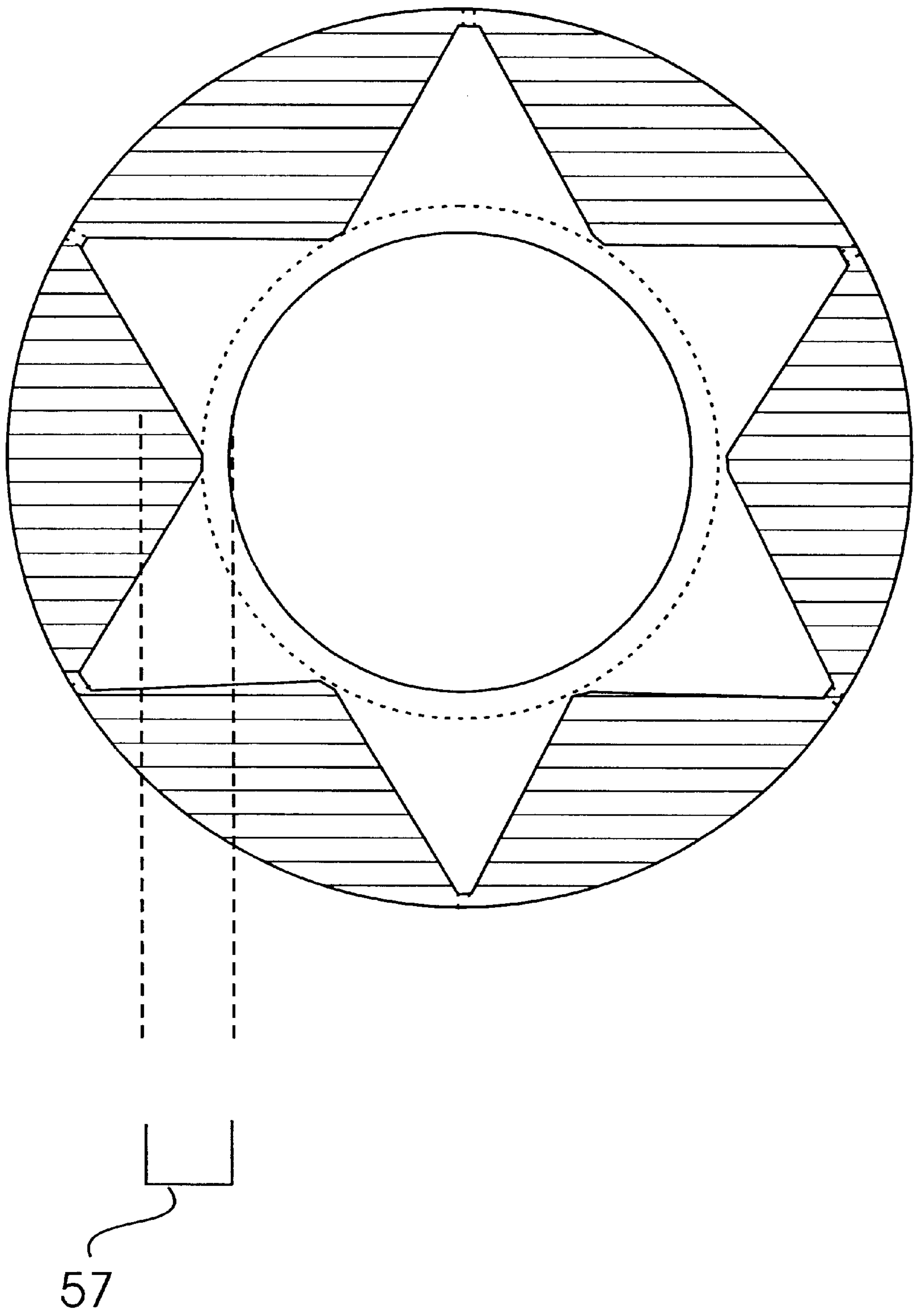
FIG. 28 Top view, simplified schematic of geometry showing diameter-reducing advantages of the multitude of smaller, multiply-dispersed collecting voids in the Density Screening method.

In FIG. 23 (see also FIG. 4), the primary fluid flow enters the top of the device and is diverted into vertical inlet tubes which penetrate all of the stacked cones and release the fluid flow out into each of the spaces between the cones. The entire device (inlet, stacked cone array, and Density Screening outer wall) are all physically connected and are being rapidly rotated as a single unit by a motor a (variously attached to the top or bottom shafts or through other means of rotational transmission).

Thus gravitational spin is created within and is acting on the entire cylindrical device, including the fluid traveling down the length of the device and being spun out into the small spaces between each of the stacked cones. While it is beyond the scope of this application to review the separation method of stacked cone centrifuge cores, the heavy materials migrate outward through the spaces between the stacked cones and then are thrown outward to impact the sloped receiving voids of the Density Screen outer wall.

Centrifugal force therefore throws the heavier, separated particles outward towards the Density Screening and then into, down and through each of the pyramidal (in FIGS. 23 and 4) voids, and out to and through the ejection nozzle in each such void. Such heavy materials can then be collected by an exterior, non-rotating catchment cylinder or other device. As in all stacked cone centrifuge cores, the lighter clarified fluid, relieved of its heavier particles continues, due to the original inlet flow pressure direction, to travel downwards along the length of the device, where it exits out the bottom.

Conclusions, Ramifications and Scope of Invention

Some of the most challenging fluid separation problems faced by the United States and other countries today are those which combine two problems the solution of which in a single method has tended to be mutually exclusive in prior art. These two, paradoxical fluid separation problems are those which combine (1) very large volumes of fluid to be processed and (2) the need to remove very small, light materials from such large bodies of fluid. An example is municipal water treatment. Water volumes needing to be processed for the removal of newly chlorine-resistant bacterial cysts, are measured in the millions of acre feet (MAF), while the size of such cysts are in the one-half micron range.

Application of this Method to Previously Unsolvable Problems

Prior art fluid separation devices tend to either be able to remove such very small particles, but only in small, batch-fed volumes (using tubal centrifuges), or can process fluids in large volumes, such as 400 gallons per minute (decanting and stacked-cone centrifuges), but are limited to removing particles larger than 5 microns in size. Practical fluid separation methods for removing extremely small, extremely light materials from continuous-flow, high volumes of fluids do not appear in reviews of existing product, technical or patent literature.

Devices such as laboratory sized tubal and ultra centrifuges, which can attain the comparatively higher levels of centrifugal force, in the range of 8,000 to 10,000 gravities, are tall and narrow, affording comparatively long residence time along with the high spin forces they attain. Thus tall and narrow self-defines as the shape of choice for removing materials that are very light, very small and/or which have a comparatively low density differential from their carrying fluid medium.

Devices such as decanting centrifuges, which retain the long and tall geometry of tubal devices, trade off the high spin speed advantages of tubals in order to provide continuous (i.e., non-batch) transport and removal of heavy materials thrown out of the spinning fluid core. They employ mechanical blades scraping the heavy materials from their outer walls, which does make these devices operate continuously, but which also effectively limits their spin speeds to below those required to remove a practical percentage of ultra lightweight particles from fluids being processed.

Devices such as stacked cone centrifuges, which use their beltline slope catchment area to accumulate heavy particles thrown from a spinning fluid core, offer the ideal continuous and elegant, non-mechanical method for removing or transporting such material, but to date, use a total device geometry which is short and squat, thus rendering them as well incapable of spinning at the comparatively high revolutions per minute to produce the high gravities needed to remove ultra light, small particles.

The inventors sought to combine the long and tall geometry from tubal and decanting centrifuges for its long residence time and high spin rate potential, with the elegant sloped geometry, non-mechanical heavy particle transport designs of stacked cone centrifuges. The resulting novel and heretofore undocumented geometry, when combined with the inventors'entirely new material hybrid construction methods, promises long and tall devices, with the long residence time, unprecedentedly high spin rates, and continuous, non-mechanical heavy particle transport and removal performance needed for many of today's unsolved, large volume, small particle environmental and other fluid separation problems.

Application of this Method to Improve Existing Handling of Problems

The outer wall, transport geometry method outlined in this application, and the method for combining various late $20^{th}$ century material technologies to produce unprecedented strength synergy in conjunction with this geometry method, are also extremely viable for use in retrofitting and improving the performance of existing tubal and decanting centrifuges. The inventors already have numerous such retrofitting/combination device patent applications prepared, for filing immediately after submission of this master, utility application.

What is claimed:

1. A method for separating and removing heavy particles from a fluid using a centrifugal device, comprising:

positioning an inner cylinder within an outer cylinder to form a fluid flowpath between the exterior of the inner cylinder and the interior of the outer cylinder;

directing the fluid to travel from one end of the fluid flowpath to the other end of the fluid flowpath while the cylinders are rotating;

forming the outer cylinder with a thick-shelled wall having a width and a plurality of cut away indented pyramidal voids comprising a depth, wherein the depth of the cut away indented pyramidal voids is substantially the same or about the same as the width of the thick-shelled wall;

forming a respective nozzle within each pyramidal void to allow transport of heavy particles from the fluid through the respective nozzles to an external receiving containment; and allowing the fluid to travel through the fluid flowpath while simultaneously transporting the heavy particles through the outer cylinder by cooperation between the sloped surfaces of the pyramidal voids and the respective nozzles.

2. The method of claim 1 wherein the fluid comprises at least one liquid constrained between the inner cylinder and the outer cylinder.

3. The method of claim 1 wherein the fluid comprises at least one gas constrained between the inner cylinder and the outer cylinder.

4. The method of claim 1 further comprising forming the thick-shelled wall to have symmetrical pyramidal spaces.

5. A method for separating and removing heavy particles from a fluid using a centrifugal force device, comprising; positioning an inner cylinder within an outer cylinder to form a fluid flow path between the exterior of the inner cylinder and the interior of the outer cylinder;

directing the fluid to travel from one end of the fluid flow path to the other end of the flow path while the cylinders are rotating; and forming the outer cylinder with a thick-shelled wall comprising a width and a plurality of cut away indented pyramidal voids which are cut through substantially the entire width of the thick-shelled wall.

* * * * *